US012714997B2

(12) United States Patent
Spero et al.

(10) Patent No.: US 12,714,997 B2
(45) Date of Patent: Aug. 25, 2026

(54) MAGNETIC-BASED ACTUATION MECHANISMS FOR ACTUATING MAGNETICALLY-RESPONSIVE MICROPOSTS IN A REACTION CHAMBER

(71) Applicant: Redbud Labs, Inc., Research Triangle Park, NC (US)

(72) Inventors: Richard Chasen Spero, Research Triangle Park, NC (US); Jay Kenneth Fisher, Research Triangle Park, NC (US)

(73) Assignee: Redbud Labs, Inc., Research Triangle Park, NC (US)

( * ) Notice: Subject to any disclaimer, the term of this patent is extended or adjusted under 35 U.S.C. 154(b) by 1070 days.

(21) Appl. No.: 17/776,810

(22) PCT Filed: Nov. 16, 2020

(86) PCT No.: PCT/US2020/060739
§ 371 (c)(1),
(2) Date: May 13, 2022

(87) PCT Pub. No.: WO2021/097430
PCT Pub. Date: May 20, 2021

(65) Prior Publication Data

US 2022/0401950 A1 Dec. 22, 2022

Related U.S. Application Data

(60) Provisional application No. 62/936,271, filed on Nov. 15, 2019.

(51) Int. Cl.
*B01L 3/00* (2006.01)
*B01F 33/3032* (2022.01)
(Continued)

(52) U.S. Cl.
CPC ...... *B01L 3/50273* (2013.01); *B01F 33/3032* (2022.01); *B01F 33/4533* (2022.01);
(Continued)

(58) Field of Classification Search
CPC ......... B01L 3/50273; B01L 2300/0816; B01L 2300/0851; B01L 2400/043;
(Continued)

(56) References Cited

U.S. PATENT DOCUMENTS 6,033,574 A 3/2000 Siddiqi
9,121,306 B2 * 9/2015 Aizenberg .............. A61L 27/28
(Continued)

FOREIGN PATENT DOCUMENTS

WO 2018183126 A1 10/2018
WO WO-2019195818 A1 * 10/2019 ........ B01L 3/502746

OTHER PUBLICATIONS

International Search Report and Written Opinion issued in counterpart PCT Application No. PCT/US2020/060739 dated Apr. 6, 2021 (sixteen (16) pages).

*Primary Examiner* — Jennifer Wecker
*Assistant Examiner* — Britney N. Washington
(74) *Attorney, Agent, or Firm* — E. Eric Mills; Nicholas P. Stadnyk; Maynard Nexsen PC

(57) ABSTRACT

Magnetic-based actuation mechanisms for and methods of actuating magnetically-responsive microposts in a reaction (or assay) chamber is disclosed. For example, a microfluidics system is provided that includes a microfluidics device (or cartridge) that includes the reaction (or assay) chamber in which a field of magnetically-responsive surface-attached microposts is installed. The presently disclosed magnetic-based actuation mechanisms are provided in close proximity to the magnetically-responsive microposts wherein the magnetic-based actuation mechanisms are used for actuating the
(Continued)

magnetically-responsive microposts. For example, the magnetic-based actuation mechanisms generate an actuation force that is used to induce, for example, synchronized beat patterns and/or metachronal beat patterns in the magnetically-responsive microposts. Additionally, a method of using the presently disclosed magnetic-based actuation mechanisms for actuating the magnetically-responsive microposts is provided.

13 Claims, 26 Drawing Sheets

(51) Int. Cl.

| | |
|---|---|
| ***B01F 33/453*** | (2022.01) |
| ***B01F 101/23*** | (2022.01) |
| ***H01F 7/08*** | (2006.01) |

(52) U.S. Cl.
CPC .......... *B01F 33/4535* (2022.01); *H01F 7/081* (2013.01); *B01F 2101/23* (2022.01); *B01L 2300/0816* (2013.01); *B01L 2300/0851* (2013.01); *B01L 2400/043* (2013.01); *B01L 2400/086* (2013.01)

(58) Field of Classification Search
CPC ............ B01L 2400/086; B01F 33/3032; B01F 33/4533; B01F 33/4535; B01F 2101/23; B01F 33/30; B01F 33/453; H01F 7/081; C12M 23/16; C12M 27/16; C12M 35/06; F04B 19/006; F04B 43/08
See application file for complete search history.

(56) References Cited

U.S. PATENT DOCUMENTS

| | | | | |
|---|---|---|---|---|
| 9,612,185 | B2 * | 4/2017 | Superfine ............. | G01N 29/022 |
| 2006/0001200 | A1 | 1/2006 | Takahashi | |
| 2010/0264090 | A1 | 10/2010 | Ellis et al. | |
| 2017/0007972 | A1 * | 1/2017 | Tien ...................... | B01F 33/453 |
| 2022/0401950 | A1 * | 12/2022 | Spero ...................... | H01F 7/081 |

* cited by examiner

MAGNETIC-BASED ACTUATION MECHANISMS FOR ACTUATING MAGNETICALLY-RESPONSIVE MICROPOSTS IN A REACTION CHAMBER

CROSS REFERENCE TO RELATED APPLICATIONS

The presently disclosed subject matter is a 35 U.S.C. § 371 U.S. national phase entry of International Application No. PCT/US2020/060739 having an international filing date of Nov. 16, 2020, which is related to and claims priority to U.S. Patent Provisional No. 62/936,271, filed on Nov. 15, 2019, and is further related by subject matter to U.S. Patent Provisional No. 62/654,048, entitled "Magnetic-Based Actuation Mechanisms for and Methods of Actuating magnetically-responsive Microposts in a Reaction Chamber," filed on Apr. 16, 2018; the entire disclosures of which are incorporated herein by reference.

STATEMENT REGARDING FEDERALLY SPONSORED RESEARCH

This invention was made with governmental support under Grant No. 5R44GM122159 awarded by the National Institutes of Health (NIH). The government has certain rights in the invention.

TECHNICAL FIELD OF THE INVENTION

The invention relates to methods of processing liquids and more particularly to magnetic-based actuation mechanisms for and methods of actuating magnetically-responsive active surfaces in a reaction chamber.

BACKGROUND

Microfluidic devices can include one or more active surfaces, which can be, for example, surface-attached microposts in a reaction chamber that are used for capturing target analytes in a biological fluid. Exemplary microfluidic devices include those described in U.S. Pat. Nos. 9,238,869 and 9,612,185, both entitled "Methods and Systems for Using Actuated Surface-Attached Posts for Assessing Biofluid Rheology," which are directed to methods, systems, and computer readable media for using actuated surface-attached posts for assessing biofluid rheology. According to one aspect, a method for testing properties of a biofluid specimen includes placing the specimen onto a micropost array having a plurality of microposts extending outwards from a substrate, wherein each micropost includes a proximal end attached to the substrate and a distal end opposite the proximal end and generating an actuation force in proximity to the micropost array to actuate the microposts, thereby compelling at least some of the microposts to exhibit motion. The method further includes measuring the motion of at least one of the microposts in response to the actuation force and determining a property of the specimen based on the measured motion of the at least one micropost.

Microfluidic systems can include an active surface, which can be, for example, any surface or area (typically inside a reaction (or assay) chamber) that is used for processing biological materials. Various fluidic operations, such as, but not limited to, mixing operations, washing operations, binding operations, and cell processing operations, can take place within the reaction (or assay) chamber. However, there is often little or poor control of the fluid flowing within the chamber. Therefore, new approaches are needed to provide better fluid flow control in a microfluidic system.

SUMMARY

To address the foregoing problems, in whole or in part, and/or other problems that may have been observed by persons skilled in the art, the present disclosure provides compositions and methods as described by way of example as set forth below.

The invention provides a microfluidics system. The microfluidics system may include a microfluidic device and a magnetic-based actuation mechanism. The microfluidics device may include a reaction chamber and a magnetically-responsive active surface on an inner surface of the reaction chamber. The magnetic-based actuation mechanism may be configured to generate an actuation force. The magnetic-based actuation mechanism may be situated in sufficient proximity to the active surface to permit the actuation force to actuate the active surface. The magnetic-based actuation mechanism may include a rotatable magnet mounting surface that may include at least one magnet mounted thereon, but preferably two or more magnets mounted thereon, and may be arranged in a substantially circular configuration concentric to an axis of rotation of the rotatable magnet mounting surface.

In certain embodiments of the invention, when in rotational operation, the rotatable magnet mounting surface may cause the actuation force to be directionally-fluctuating and time-varying relative to the active surface.

In certain embodiments of the invention, the rotatable magnet mounting surface may include 2 to 20 magnets.

In certain embodiments of the invention, the rotatable magnet mounting surface may include 2 to 10 magnets.

In certain embodiments of the invention, the rotatable magnet mounting surface may include 1, 2, 3, 4, 5, 6, 7, 8, 9, 10, 11, 12, 13, 14, 15, 16, 17, 18, 19, or 20 magnets.

In certain embodiments of the invention, the microfluidics system may include an even number of magnets.

In certain embodiments of the invention, the microfluidics system may include an odd number of magnets.

In certain embodiments of the invention, the active surface may include a micropost field that may include surface-attached magnetically-responsive microposts.

In certain embodiments of the invention, the actuation force may be sufficient to compel at least some of the magnetically-responsive microposts to exhibit motion.

In certain embodiments of the invention, the rotatable magnet mounting surface may be rotatable in a plane of rotation that may be substantially parallel to the plane of the active surface.

In certain embodiments of the invention, the rotatable magnet mounting surface may be rotatable in a plane of rotation that may be substantially vertical to a plane of the active surface.

In certain embodiments of the invention, the rotatable magnet mounting surface may have a shape selected from the group consisting of disc-shaped, polygonal, star-shaped, and hub-and-spoke shaped.

In certain embodiments of the invention, the magnets may be substantially equally spaced apart from each other in the circular configuration.

In certain embodiments of the invention, the magnets may be arranged in the circular configuration such that a line passing through a north-south pole of each magnet may be parallel to the circular configuration and may intersect the axis of rotation of the rotatable magnet mounting surface.

In certain embodiments of the invention, each magnet may have a north pole and a south pole that may be oriented substantially in the same plane.

In certain embodiments of the invention, the north-south orientation of the north pole and the south pole of each adjacent magnet in the circular configuration may alternate.

In certain embodiments of the invention, the rotatable magnet mounting surface may include one or more arc-shaped or wedge-shaped magnets that may be arranged in a concentric relationship about the axis of rotation.

In certain embodiments of the invention, the wedge-shaped magnets may be arranged in the substantially circular configuration about the axis of rotation, wherein for each wedge-shaped magnet, there may be a line which intersects the axis of rotation and symmetrically bisects the wedge, and wherein each wedge may point towards the axis of rotation or away from the axis of rotation.

In certain embodiments of the invention, the wedge-shaped magnets may be arranged in the substantially circular configuration about the axis of rotation, wherein for each wedge-shaped magnet, there may be a line which intersects the axis of rotation and symmetrically bisects the wedge, and wherein each wedge may point towards the axis of rotation or away from the axis of rotation.

In certain embodiments of the invention, the wedges may alternate in orientation with each wedge pointing towards the axis of rotation or away from the axis of rotation in a direction which may be opposite to its nearest neighbor wedges.

In certain embodiments of the invention, microfluidics system may include arc-shaped magnets that may be arranged in the substantially circular configuration about the axis of rotation, wherein for each arc-shaped magnet, there may be a line which intersects the axis of rotation and symmetrically bisects the arc-shaped magnet, and wherein the arc-shaped magnet may have an arc apex that may be oriented proximal to axis of rotation.

In certain embodiments of the invention, the arc-shaped magnets may be arranged in the substantially circular configuration about the axis of rotation, wherein for each arc-shaped magnet, there may be a line which intersects the axis of rotation and symmetrically bisects the arc-shaped magnet, and wherein the arc-shaped magnet may have an arc apex that may be oriented distal to axis of rotation.

In certain embodiments of the invention, each arc apex may be oriented proximal to the axis of rotation or distal from the axis of rotation in a direction which may be opposite to its nearest neighbor arc apexes.

In certain embodiments of the invention, the microfluidics system may include bar-shaped magnets.

The invention provides a microfluidics system. The microfluidics system may include a microfluidic device and a magnetic-based actuation mechanism. The microfluidic device may include a reaction chamber and a magnetically-responsive active surface on an inner surface of the reaction chamber. The magnetic-based actuation mechanism may be configured to generate an actuation force. The magnetic-based actuation mechanism may be situated in sufficient proximity to the active surface to permit the actuation force to actuate the active surface. The magnetic-based actuation mechanism may include a conveyor surface that may include magnets mounted thereon.

In certain embodiments of the invention, the movement of the conveyor surface may cause the actuation force to be directionally-fluctuating and time-varying relative to the active surface.

In certain embodiments of the invention, the conveyor surface may include a conveyor belt and a rotational conveyor apparatus configured to cause movement of the conveyor belt.

In certain embodiments of the invention, the rotational conveyor apparatus may be configured to cause unidirectional movement of the conveyor belt.

In certain embodiments of the invention, the rotational conveyor apparatus may be configured to cause bidirectional movement of the conveyor belt.

In certain embodiments of the invention, the rotational conveyor apparatus may be configured to cause oscillation of the conveyor belt.

The invention provides a microfluidics system. The microfluidics system may include a microfluidic device and a magnetic-based actuation mechanism. The microfluidic device may include a reaction chamber and a magnetically-responsive active surface on an inner surface of the reaction chamber. The magnetic-based actuation mechanism may be configured to generate an actuation force. The magnetic-based actuation mechanism may be situated in sufficient proximity to the active surface to permit the actuation force to actuate the active surface. The magnetic-based actuation mechanism may include a shaker plate that includes magnets mounted thereon and a shaker configured to move the shaker plate and thereby move the magnets and thereby actuate the magnetically-responsive active surface.

In certain embodiments of the invention, the shaker may be configured to move the shaker plate in one-dimensional pattern, a two-dimensional pattern, or a three-dimensional pattern.

In certain embodiments of the invention, the active surface may include magnetically-responsive microposts and the magnetic-based actuation mechanism may actuate the magnetically-responsive microposts in a beat pattern.

In certain embodiments of the invention, the beat pattern may be selected from a group consisting of a tilted conical beat pattern, a side-to-side beat pattern, a synchronized beat pattern, and/or a metachronal beat pattern.\

In certain embodiments of the invention, the magnetic-based actuation mechanism may include a magnet fixedly attached to a drive shaft of a motor, whereby rotation of the drive shaft may cause the actuation force to be directionally-fluctuating and time-varying relative to the active surface.

In certain embodiments of the invention, the magnetic-based actuation mechanisms may include a plurality of magnetic field geometries that may be moveable relative to the magnetically-responsive microposts thereby creating magnetic field pumping actions in the reaction chamber.

The invention provides a method for effecting movement or circulation of a fluid. The method may include providing the microfluidics system of the invention. The method may include flowing a liquid onto the active surface. The method may include using the magnetic-based actuation mechanism to actuate the active surface, which may cause movement or circulation of the liquid in the reaction chamber.

Other compositions, methods, features, and advantages of the invention will be or will become apparent to one with skill in the art upon examination of the following figures and detailed description. It is intended that all such additional compositions, methods, features, and advantages be included within this description, be within the scope of the invention, and be protected by the accompanying claims.

BRIEF DESCRIPTION OF THE DRAWINGS

The features and advantages of the present invention will be more clearly understood from the following description taken in conjunction with the accompanying drawings, which are not necessarily drawn to scale.

FIG. 8A, FIG. 8B, FIG. 8C, FIG. 8D, and FIG. 8E illustrate end views of other examples of carousel-like magnetic-based actuation mechanisms that are rotatable.

DETAILED DESCRIPTION OF EXEMPLARY EMBODIMENTS

Definitions

Figure 1:
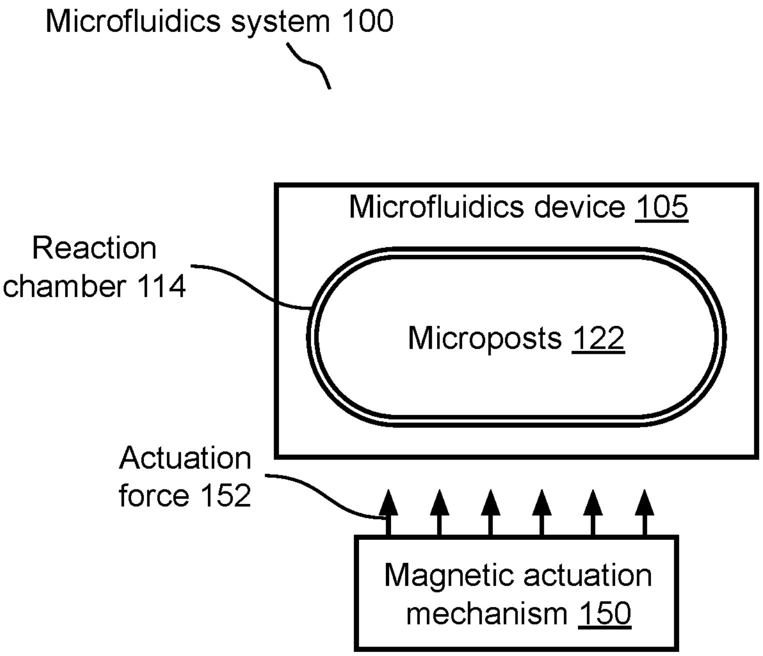
FIG. 1 illustrates a block diagram of an example of a microfluidics system that includes a microfluidics device in relation to the presently disclosed magnetic-based actuation mechanisms for actuating surface-attached microposts.

"Active surface" means any surface or area that can be used for processing samples including, but not limited to, biological materials, fluids, environmental samples (e.g., water samples, air samples, soil samples, solid and liquid wastes, and animal and vegetable tissues), and industrial samples (e.g., food, reagents, and the like). The active surface can be inside a reaction or assay chamber. For example, the active surface can be any surface that has properties designed to manipulate the fluid inside the chamber. Manipulation can include, for example, generating fluid flow, altering the flow profile of an externally driven fluid, fractionating the sample into constituent parts, establishing or eliminating concentration gradients within the chamber, and the like. Surface properties that might have this effect can include, for example, post technology—whether static or actuated (i.e., activated). The surface properties may also include microscale texture or topography in the surface, physical perturbation of the surface by vibration or deformation; electrical, electronic, electromagnetic, and/or magnetic system on or in the surface; optically active (e.g., lenses) surfaces, such as embedded LEDs or materials that interact with external light sources; and the like.

"Surface-attached post" or "surface-attached micropost" or "surface-attached structure" or "micropost" are used interchangeably. Generally, a surface-attached structure has two opposing ends: a fixed end and a free end. The fixed end may be attached to a substrate by any suitable means, depending on the fabrication technique and materials employed. The fixed end may be "attached" by being integrally formed with or adjoined to the substrate, such as by a microfabrication process. Alternatively, the fixed end may be "attached" via a bonding, adhesion, fusion, or welding process. The surface-attached structure has a length defined from the fixed end to the free end, and a cross-section lying in a plane orthogonal to the length. For example, using the Cartesian coordinate system as a frame of reference, and associating the length of the surface-attached structure with the z-axis (which may be a curved axis), the cross-section of the surface-attached structure lies in the x-y plane.

Generally, the cross-section of the surface-attached structure may have any shape, such as rounded (e.g., circular, elliptical, etc.), polygonal (or prismatic, rectilinear, etc.), polygonal with rounded features (e.g., rectilinear with rounded corners), or irregular. The size of the cross-section of the surface-attached structure in the x-y plane may be defined by the "characteristic dimension" of the cross-section, which is shape-dependent. As examples, the characteristic dimension may be diameter in the case of a circular cross-section, major axis in the case of an elliptical cross-section, or maximum length or width in the case of a polygonal cross-section. The characteristic dimension of an irregularly shaped cross-section may be taken to be the dimension characteristic of a regularly shaped cross-section that the irregularly shaped cross-section most closely approximates (e.g., diameter of a circle, major axis of an ellipse, length or width of a polygon, etc.).

A surface-attached structure as described herein is non-movable (static, rigid, etc.) or movable (flexible, deflectable, bendable, etc.) relative to its fixed end or point of attachment to the substrate. To facilitate the movability of movable surface-attached structures, the surface-attached structure may include a flexible body composed of an elastomeric (flexible) material and may have an elongated geometry in the sense that the dominant dimension of the surface-attached structure is its length—that is, the length is substantially greater than the characteristic dimension. Examples of the composition of the flexible body include, but are not limited to, elastomeric materials such as hydrogel and other active surface materials (for example, polydimethylsiloxane (PDMS)).

The movable surface-attached structure is configured such that the movement of the surface-attached structure relative to its fixed end may be actuated or induced in a non-contacting manner, specifically by an applied magnetic or electric field of a desired strength, field line orientation, and frequency (which may be zero in the case of a magneto static or electrostatic field). To render the surface-attached structure movable by an applied magnetic or electric field, the surface-attached structure may include an appropriate metallic component disposed on or in the flexible body of the surface-attached structure. To render the surface-attached structure responsive to a magnetic field, the metallic component may be a ferromagnetic material such as, for example, iron, nickel, cobalt, or magnetic alloys thereof, one non-limiting example being "alnico" (an iron alloy containing aluminum, nickel, and cobalt). To render the surface-attached structure responsive to an electric field, the metallic component may be a metal exhibiting good electrical conductivity such as, for example, copper, aluminum, gold, and silver, and well as various other metals and metal alloys. Depending on the fabrication technique utilized, the metallic component may be formed as a layer (or coating, film, etc.) on the outside surface of the flexible body at a selected region of the flexible body along its length. The layer may be a continuous layer or a densely grouped arrangement of particles. Alternatively, the metallic component may be formed as an arrangement of particles embedded in the flexible body at a selected region thereof.

As used herein, the term "actuation force" refers to the force applied to the microposts. For example, the actuation force may include a magnetic, thermal, sonic, or electric force. Notably, the actuation force may be applied as a function of frequency or amplitude, or as an impulse force (i.e., a step function). Similarly, other actuation forces may be used without departing from the scope of the present subject matter, such as fluid flow across the micropost array (e.g., flexible microposts that are used as flow sensors via monitoring their tilt angle with an optical system).

Accordingly, the application of an actuation force actuates the movable surface-attached microposts into movement. For example, the actuation occurs by contacting the cell processing chamber with the control instrument comprising elements that provide an actuation force, such as a magnetic or electric field. Accordingly, the control instrument includes, for example, any mechanisms for actuating the microposts (e.g., magnetic system), any mechanisms for counting the cells (e.g., imaging system), the pneumatics for pumping the fluids (e.g., pumps, fluid ports, valves), and a controller (e.g., microprocessor).

A "flow cell" is any chamber comprising a solid surface across which one or more liquids can be flowed, wherein the chamber has at least one inlet and at least one outlet.

The term "micropost array" is herein used to describe an array of small posts, extending outwards from a substrate, that typically range from 1 to 100 micrometers in height. In one embodiment, microposts of a micropost array may be vertically-aligned. Notably, each micropost includes a proximal end that is attached to the substrate base and a distal end or tip that is opposite the proximal end. Microposts may be arranged in arrays such as, for example, the microposts described in U.S. Pat. No. 9,238,869, entitled "Methods and systems for using actuated surface-attached posts for assessing biofluid rheology," issued on Jan. 19, 2016; the entire disclosure of which is incorporated herein by reference. U.S. Pat. No. 9,238,869 describes methods, systems, and computer readable media for using actuated surface-attached posts for assessing biofluid rheology. One method described in U.S. Pat. No. 9,238,869 is directed to testing properties of a biofluid specimen that includes placing the specimen onto a micropost array having a plurality of microposts extending outwards from a substrate, wherein each micropost includes a proximal end attached to the substrate and a distal end opposite the proximal end, and generating an actuation force in proximity to the micropost array to actuate the microposts, thereby compelling at least some of the microposts to exhibit motion. This method further includes measuring the motion of at least one of the microposts in response to the actuation force and determining a property of the specimen based on the measured motion of the at least one micropost.

U.S. Pat. No. 9,238,869 also states that the microposts and micropost substrate of the micropost array can be formed of polydimethylsiloxane (PDMS). Further, microposts may include a flexible body and a metallic component disposed on or in the body, wherein application of a magnetic or electric field actuates the microposts into movement relative to the surface to which they are attached (e.g., wherein the actuation force generated by the actuation mechanism is a magnetic and/or electrical actuation force).

"Magnetically-responsive" means responsive to a magnetic field. "magnetically-responsive microposts" include or are composed of magnetically-responsive materials. Examples of magnetically-responsive materials include, but are not limited to, paramagnetic materials, ferromagnetic materials, ferrimagnetic materials, and metamagnetic materials. Examples of suitable paramagnetic materials include iron, nickel, and cobalt, as well as metal oxides, such as, but not limited to, ferroferric oxide ($Fe_3O_4$), barium hexaferrite ($BaFe_{12}O_{19}$), cobalt(II) oxide (CoO), nickel(II) oxide (NiO), manganese(III) oxide ($Mn_2O_3$), chromium(III) oxide ($Cr_2O_3$), and cobalt manganese phosphide (CoMnP).

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact but may be approximate and/or larger or smaller as desired, reflecting tolerances, conversion factors, rounding off, measurement error and the like, and other factors known to those of skill in the art depending on the desired properties sought to be obtained by the invention. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Magnetic-Based Actuation Mechanisms Methods of Actuating Magnetically-Responsive Microposts in a Reaction Chamber In some embodiments, the invention provides magnetic-based actuation mechanisms for and methods of actuating magnetically-responsive microposts in a reaction (or assay) chamber. For example, a microfluidics system is provided that includes a microfluidics device (or cartridge) that includes a reaction (or assay) chamber in which a field of magnetically-responsive surface-attached microposts is installed. The presently disclosed magnetic-based actuation mechanisms are provided in close proximity to the magnetically-responsive microposts wherein the magnetic-based actuation mechanisms are used for actuating the magnetically-responsive microposts. For example, the magnetic-based actuation mechanisms generate an actuation force that is used to compel at least some of the magnetically-responsive microposts to exhibit motion.

In some embodiments, the magnetic-based actuation mechanism provides a carousel-like magnet configuration that is rotatable. In one example, the magnetic-based actuation mechanism is a set of arc-shaped magnets arranged in a carousel-like configuration that is rotatable. In another example, the magnetic-based actuation mechanism is lines or arrays of bar magnets arranged in a carousel-like configuration that is rotatable. In one example, the microfluidics device with the magnetically-responsive surface-attached microposts is installed tangential to the carousel-like magnet configuration. The rotating carousel-like magnet configuration provides a directionally-fluctuating and time-varying actuation force with respect to the magnetically-responsive microposts.

In other embodiments, the magnetic-based actuation mechanism provides a disc-like magnet configuration that is rotatable. In one example, the magnetic-based actuation mechanism is a set of wedge magnets arranged in a disc-like configuration that is rotatable. In another example, the magnetic-based actuation mechanism is lines or arrays of bar magnets arranged radially in a disc-like configuration that is rotatable. In one example, the microfluidics device with the magnetically-responsive surface-attached microposts is installed a small distance away and parallel to the plane of the disc-like magnet configuration. The rotating disc-like magnet configuration provides a directionally-fluctuating and time-varying actuation force with respect to the magnetically-responsive microposts.

In yet other embodiments, the magnetic-based actuation mechanism provides a conveyor-like magnet configuration that moves the magnets linearly. For example, the magnetic-based actuation mechanism is a set of magnets (or lines or arrays of magnets) atop the conveyor belt of the conveyor-like magnet configuration. In one example, the microfluidics device with the magnetically-responsive surface-attached microposts is installed a small distance away and parallel to the plane of the conveyor belt and wherein the magnets pass in linear fashion along the microfluidics device. The conveyor-like magnet configuration provides a directionally-fluctuating and time-varying actuation force with respect to the magnetically-responsive microposts.

In yet other embodiments, the magnetic-based actuation mechanism provides a shaker plate-like magnet configuration that is movable in x, y, and z. For example, the magnetic-based actuation mechanism is a set of magnets (or lines or arrays of magnets) arranged on a shaker plate that is movable in x, y, and z. In one example, the microfluidics device with the magnetically-responsive surface-attached microposts is installed a small distance away and parallel to the plane of the shaker plate and wherein the magnets may be movable in x, y, and z with respect to the microfluidics device. The shaker plate-like magnet configuration provides a directionally-fluctuating and time-varying actuation force with respect to the magnetically-responsive microposts.

In yet other embodiments, the magnetic-based actuation mechanism provides one or more C- or U-shaped electromagnets in relation to the microfluidics device with the magnetically-responsive surface-attached microposts. For example, the one or more C- or U-shaped electromagnets can be pulsed in a pattern to induce motion in the magnetically-responsive microposts.

In yet other embodiments, magnetic shielding may be used to control the actuation force of the presently disclosed magnetic-based actuation mechanisms, wherein the magnetic shielding is arranged in a plane between the magnet and the plane of the magnetically-responsive microposts and wherein the magnetic shielding is moveable for either allowing the magnetic field of the magnet to reach the magnetically-responsive microposts or blocking the magnetic field of the magnet from reaching the magnetically-responsive microposts.

In yet other embodiments, any number, types, configurations, and/or combinations of the presently disclosed magnetic-based actuation mechanisms can be used in combination.

In yet other embodiments, the presently disclosed magnetic-based actuation mechanisms can be used to actuate the magnetically-responsive microposts in certain beat patterns, such as synchronized beat patterns and/or metachronal beat patterns.

In still other embodiments, the presently disclosed magnetic-based actuation mechanisms provide various magnetic field geometries that are movable relative to the magnetically-responsive microposts to create different pumping action in a reaction chamber.

Additionally, a method of using the presently disclosed magnetic-based actuation mechanisms for actuating the magnetically-responsive microposts is provided.

Referring now to FIG. 1 is a block diagram of an example of a microfluidics system 100 that includes a microfluidics device 105 in relation to the presently disclosed magnetic-based actuation mechanisms for actuating magnetically-responsive surface-attached microposts. Microfluidics device 105 of microfluidics system 100 is, for example, a microfluidics cartridge that includes a reaction (or assay) chamber 114. Arranged in reaction chamber 114 is a field of microposts 122. Microposts 122 are provided in a substantially continuous field or array that span the area of reaction chamber 114.

Magnetic actuation mechanism 150 is arranged in close proximity to reaction chamber 114 of microfluidics device 105, wherein magnetic actuation mechanism 150 is used for applying an actuation force 152 to the surface-attached microposts 122. As used herein, the term "actuation force" refers to the force applied to microposts 122. Magnetic actuation mechanism 150 is used to generate an actuation force (e.g., actuation force 152) in proximity to reaction chamber 114 that compels at least some of microposts 122 to exhibit motion. In microfluidics system 100, the microposts 122 of microfluidics device 105 are magnetically-responsive microposts. Accordingly, the actuation force 152 provided by magnetic actuation mechanism 150 is a magnetic actuation force.

"magnetically-responsive" means responsive to a magnetic field. "magnetically-responsive microposts" include or are composed of magnetically-responsive materials. Examples of magnetically-responsive materials include, but are not limited to, paramagnetic materials, ferromagnetic materials, ferrimagnetic materials, and metamagnetic materials. Examples of suitable paramagnetic materials include iron, nickel, and cobalt, as well as metal oxides, such as, but not limited to, ferroferric oxide ($Fe_3O_4$), barium hexaferrite ($BaFe_{12}O_{19}$), cobalt(II) oxide (CoO), nickel(II) oxide (NiO), manganese(III) oxide ($Mn_2O_3$), chromium(III) oxide ($Cr_2O_3$), and cobalt manganese phosphide (CoMnP).

In microfluidics device 105 of microfluidics system 100, the magnetically-responsive microposts 122 in relation to magnetic actuation mechanism 150 can be used to enhance various fluidic operations, such as, but not limited to, mixing operations, washing operations, binding operations, and cell processing operations, within reaction chamber 114, as compared to a microfluidics device that is absent the magnetically-responsive microposts 122 and the magnetic actuation mechanism 150. More details of microposts 122 are shown and described hereinbelow with reference to FIG. 2A, FIG. 2B, FIG. 3A, and FIG. 3B. More details of microfluidics device 105 are shown and described hereinbelow with reference to FIG. 4A, FIG. 4B, FIG. 5, FIG. 6, and FIG. 7.

Further, the magnetic actuation force 152 of magnetic actuation mechanism 150 may be applied as a function of frequency or amplitude, or as an impulse force (i.e., a step function). For example, the magnetic actuation force 152 of magnetic actuation mechanism 150 may be a time-varying actuation force.

Figure 7:
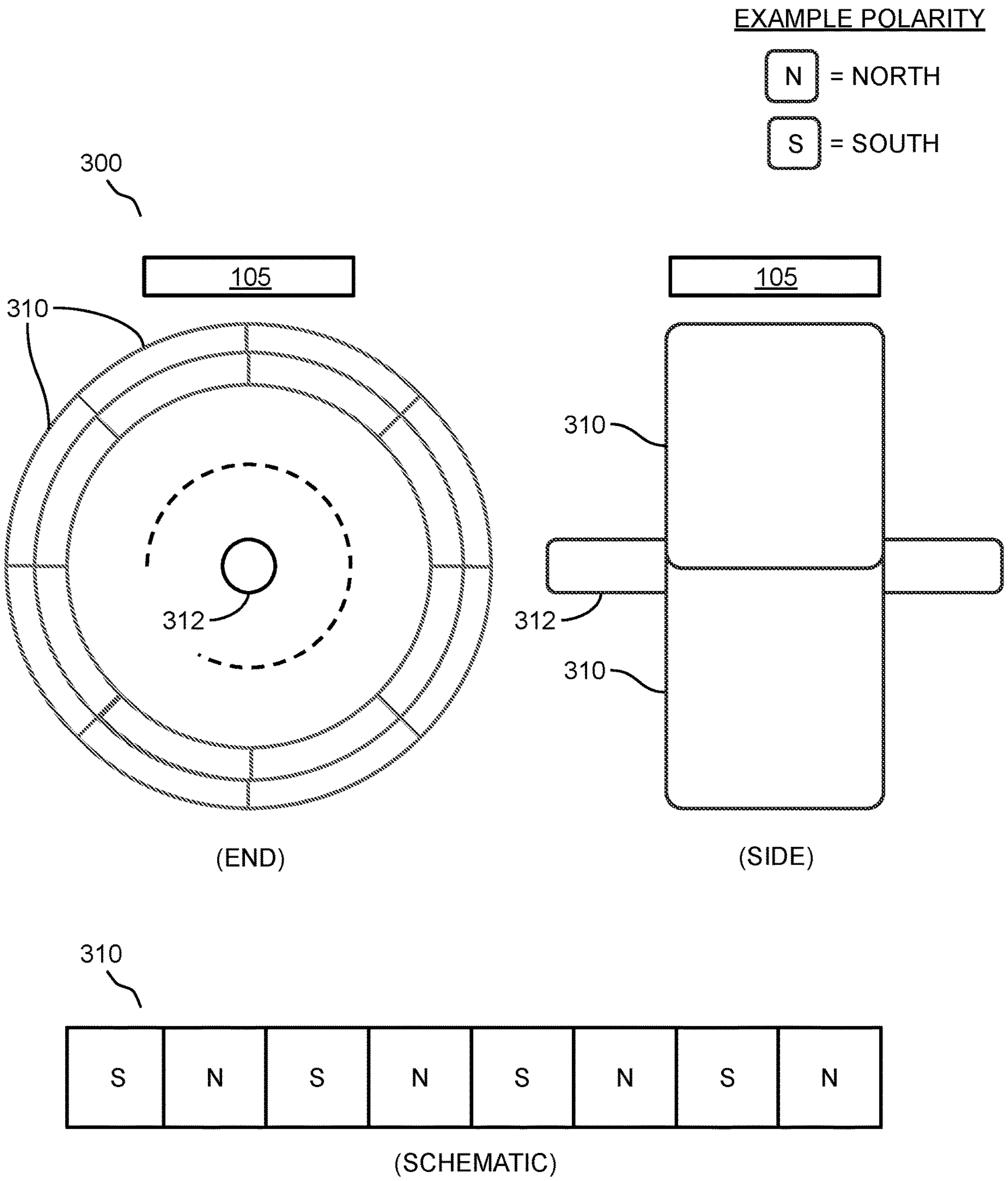
FIG. 7 illustrates an end view, a side view, and a schematic view of an example of a carousel-like magnetic-based actuation mechanism that is rotatable, which is one example of the presently disclosed magnetic-based actuation mechanism.
Figure 8A:
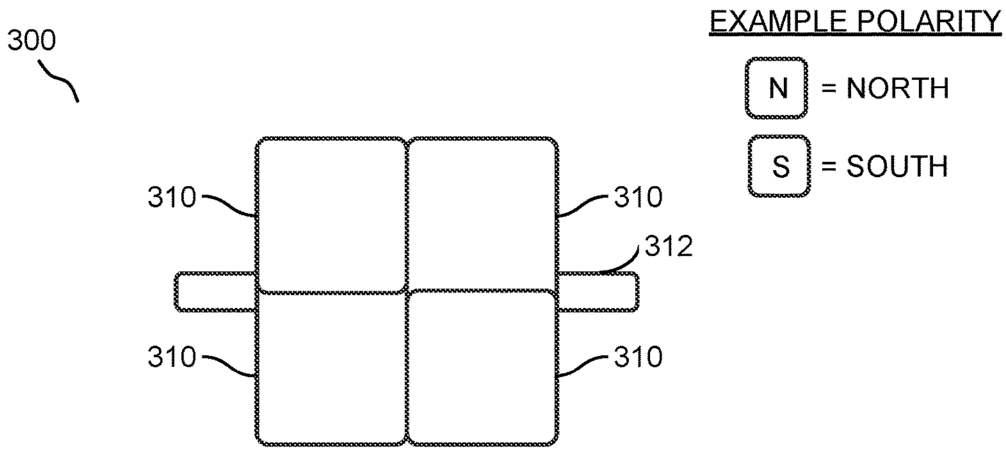
Figure 8B:
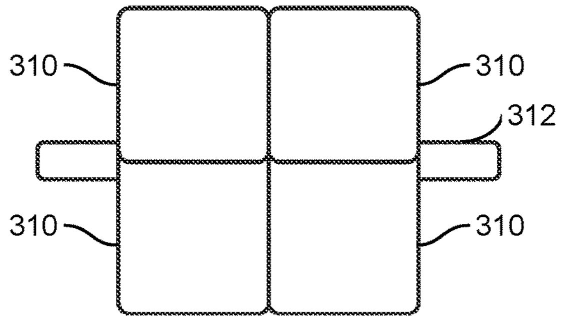
Figure 8C:
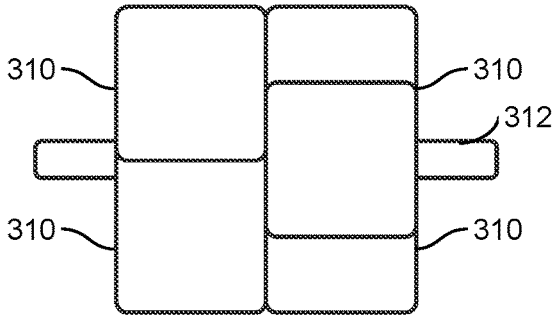
Figure 8D:
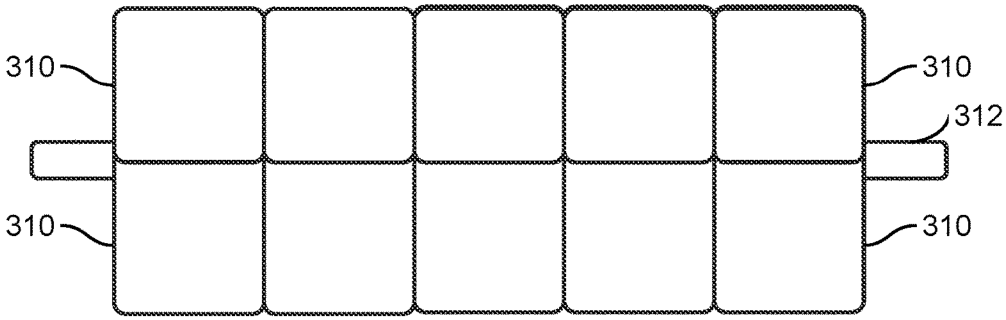
Figure 9:
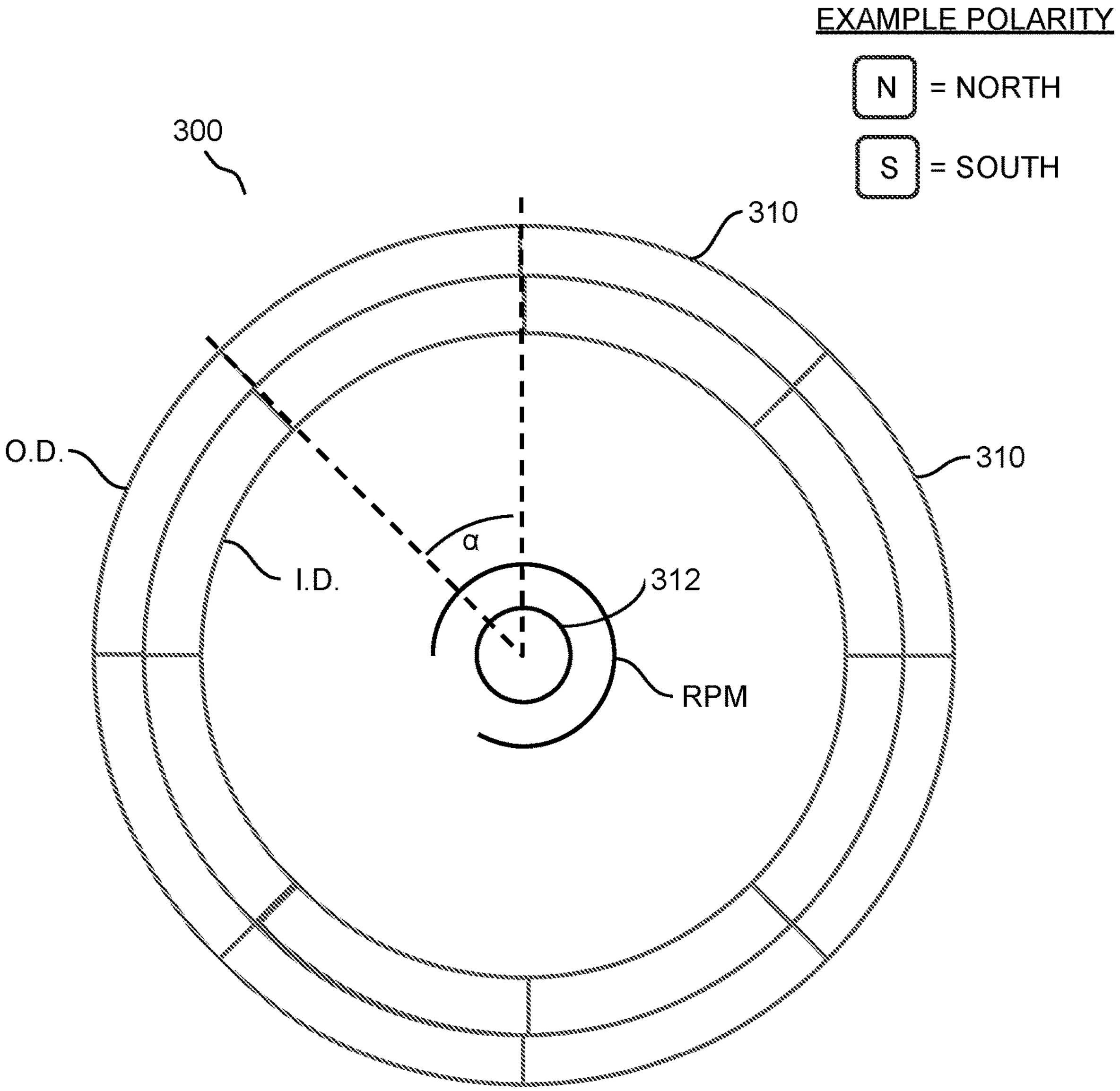
FIG. 9 illustrates an end view showing more details of the carousel-like magnetic-based actuation mechanisms shown in FIG. 7 through FIG. 8E.

In one example, magnetic actuation mechanism 150 is a carousel-like magnet configuration that is rotatable, such as a set of arc-shaped magnets arranged in a carousel-like configuration that is rotatable (see FIG. 7 through FIG. 9). In another example of a carousel-like magnet configuration, magnetic actuation mechanism 150 is lines or arrays of bar magnets arranged in the carousel-like configuration that is rotatable (see FIG. 10A through FIG. 12). In these carousel-like configurations, microfluidics device 105 with the magnetically-responsive surface-attached microposts 122 is installed tangential to the carousel-like magnet configuration.

Figure 13:
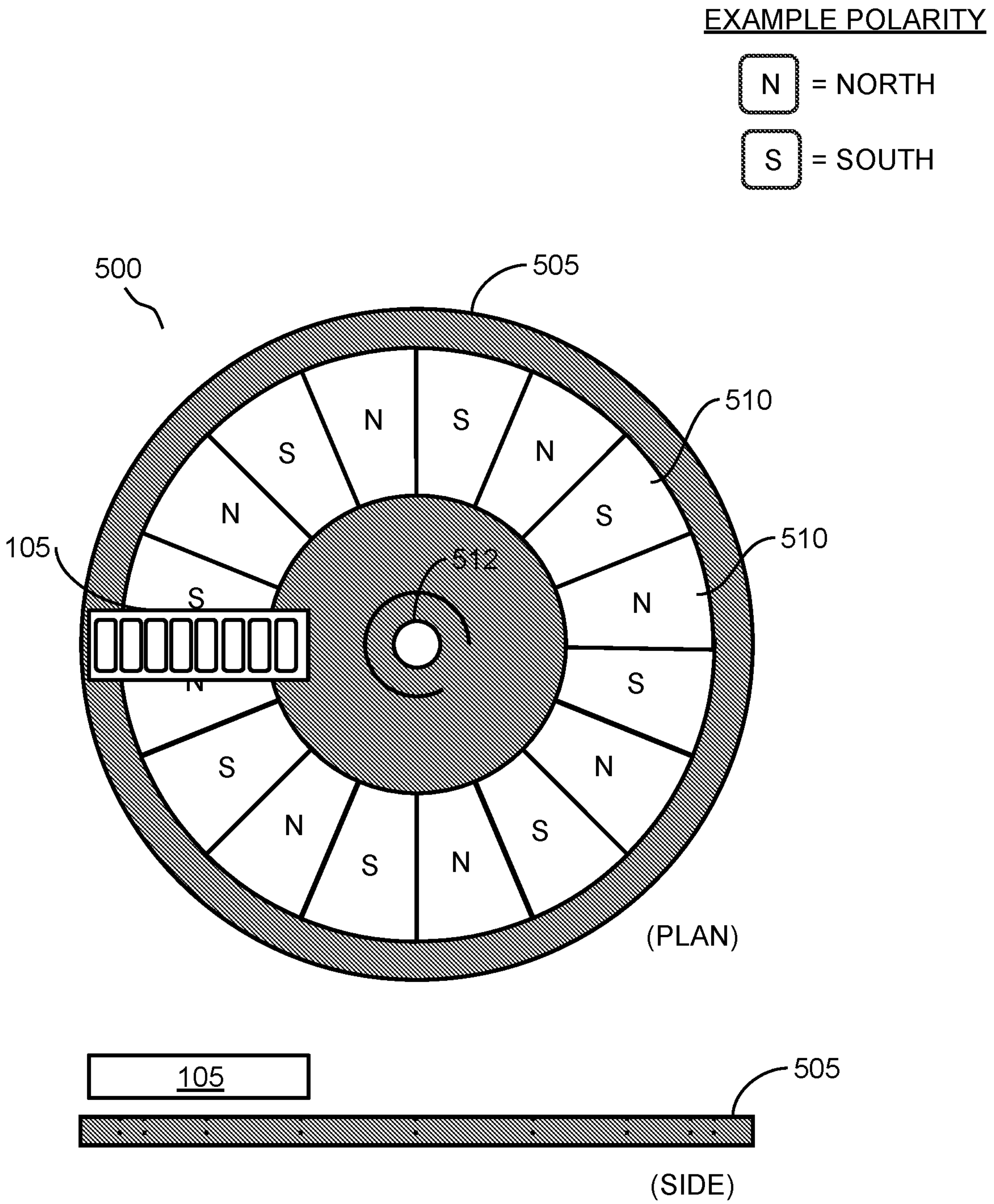
FIG. 13 illustrates a plan view and a side view of an example of a disc-like magnetic-based actuation mechanism that is rotatable, which is yet another example of the presently disclosed magnetic-based actuation mechanism.
Figure 14:
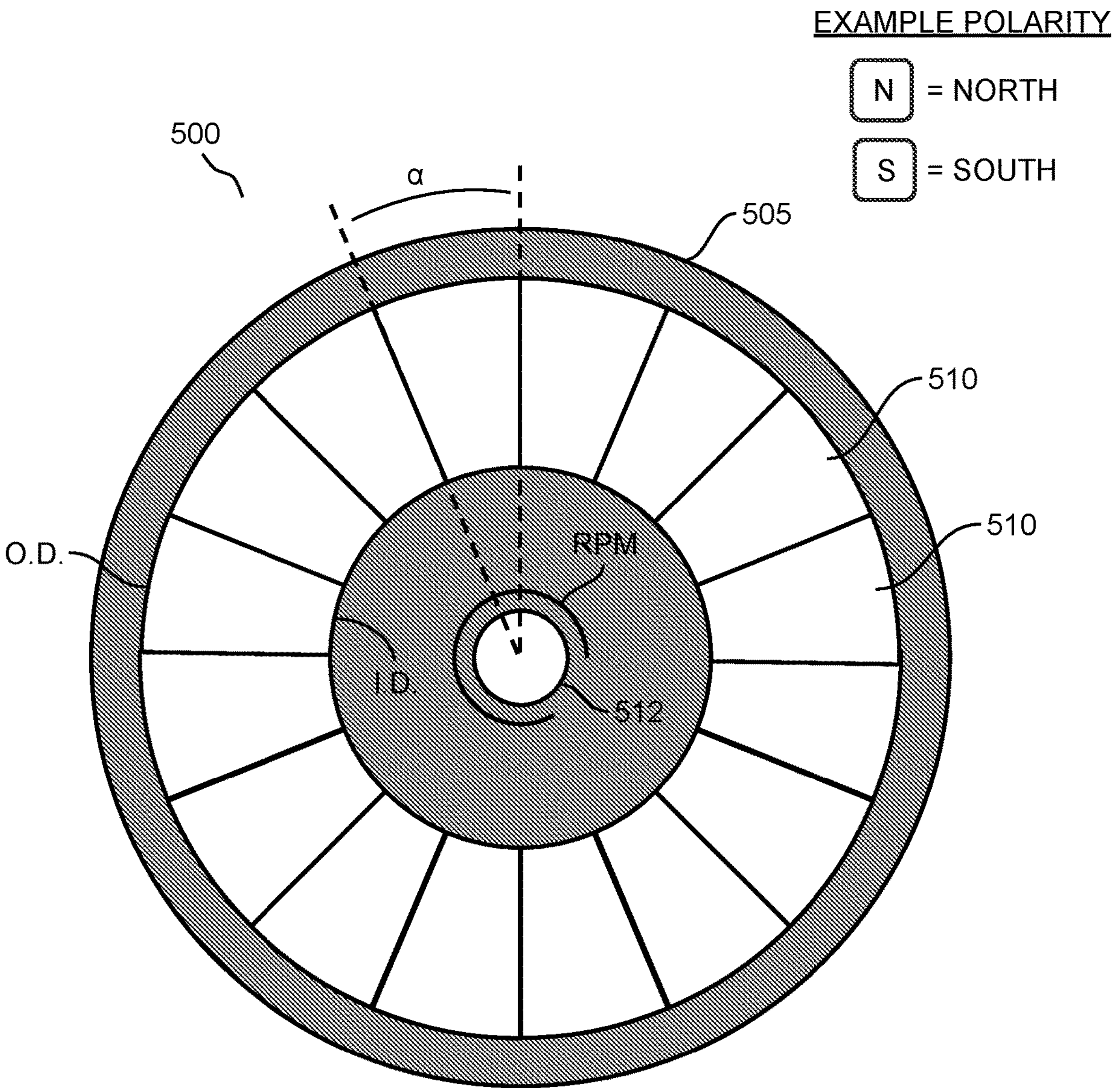
FIG. 14 illustrates a plan view showing more details of the disc-like magnetic-based actuation mechanism shown in FIG. 13.

In yet another example, magnetic actuation mechanism 150 is a disc-like magnet configuration that is rotatable, such as a set of wedge magnets arranged in a disc-like configuration that is rotatable (see FIG. 13 and FIG. 14). In another example of the disc-like magnet configuration, magnetic actuation mechanism 150 is lines or arrays of bar magnets arranged radially in a disc-like configuration that is rotatable (see FIG. 15 and FIG. 16). In these disc-like configurations, microfluidics device 105 with the magnetically-responsive surface-attached microposts 122 is installed a small distance away and parallel to the plane of the disc-like magnet configuration.

Figure 17:
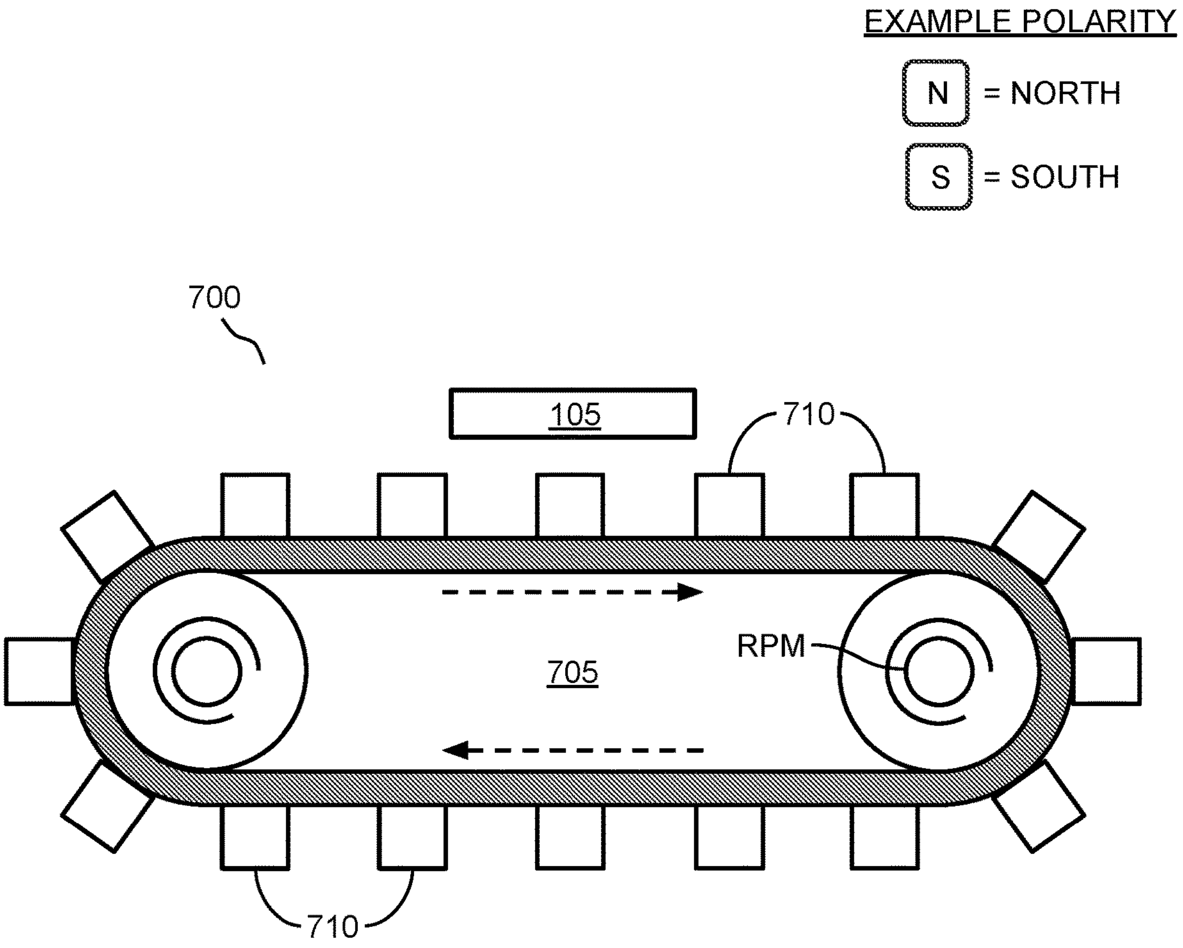
FIG. 17 illustrates a side view of an example of a conveyor-like magnetic-based actuation mechanism, which is yet another example of the presently disclosed magnetic-based actuation mechanism.

In yet another example, magnetic actuation mechanism 150 is a conveyor-like magnet configuration that moves the magnets linearly (see FIG. 17). For example, magnetic actuation mechanism 150 is a set of magnets (or lines or arrays of magnets) atop the conveyor belt of the conveyor-like magnet configuration. In this example, microfluidics device 105 with the magnetically-responsive surface-attached microposts 122 is installed a small distance away and parallel to the plane of the conveyor belt and wherein the magnets pass in linear fashion along the microfluidics device.

Figure 18:
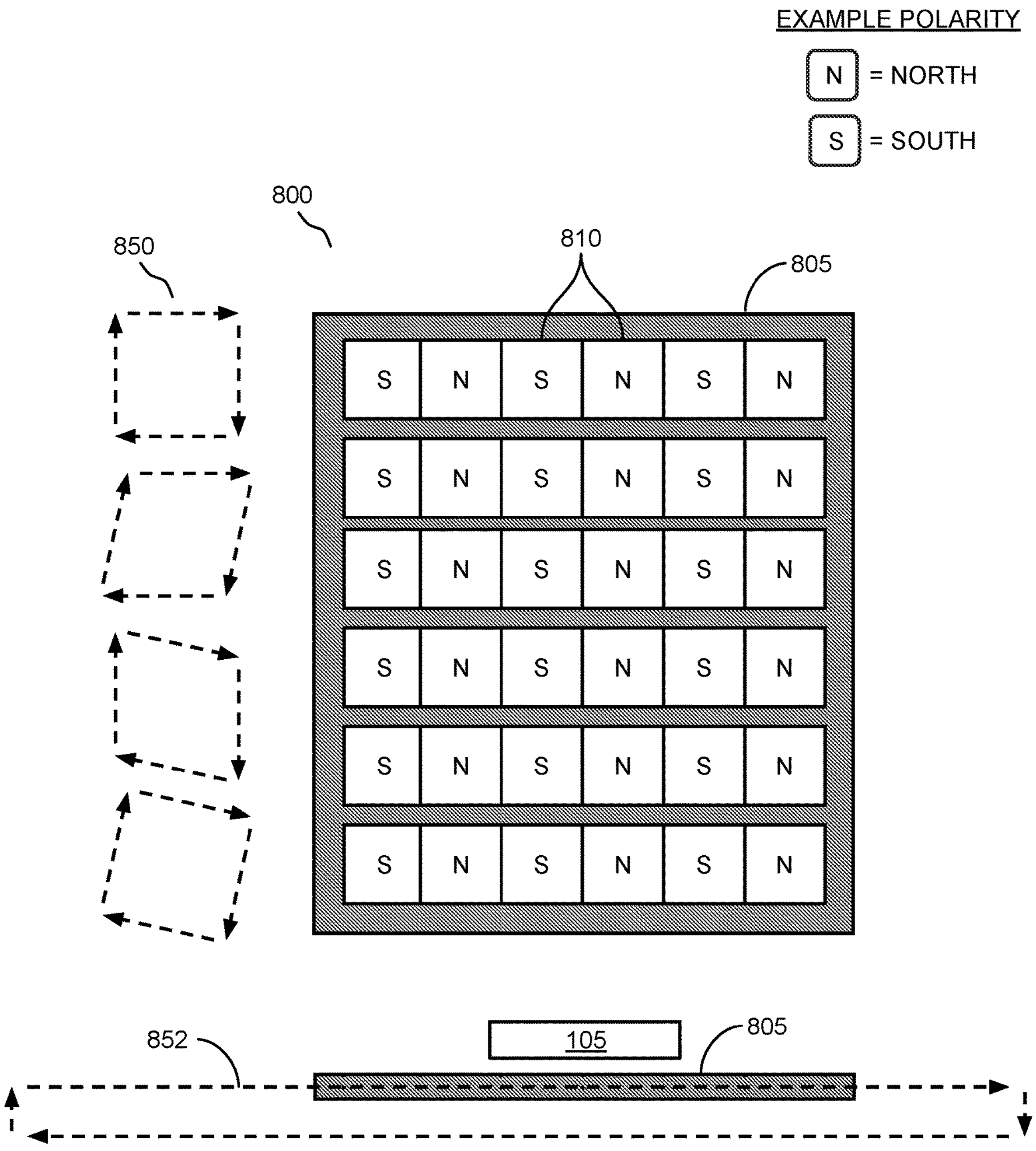
FIG. 18 illustrates a plan view and a side view of an example of a shaker plate-like magnetic-based actuation mechanism, which is yet another example of the presently disclosed magnetic-based actuation mechanism.

In yet another example, magnetic actuation mechanism 150 is a shaker plate-like magnet configuration that is movable in x, y, and z planes (see FIG. 18). For example, magnetic actuation mechanism 150 is a set of magnets (or lines or arrays of magnets) arranged on a shaker plate that is movable in x, y, and z planes. In this example, microfluidics device 105 with the magnetically-responsive surface-attached microposts 122 is installed a small distance away and parallel to the plane of the shaker plate and wherein the magnets may be movable in x, y, and z planes with respect to microfluidics device 105.

Figure 19:
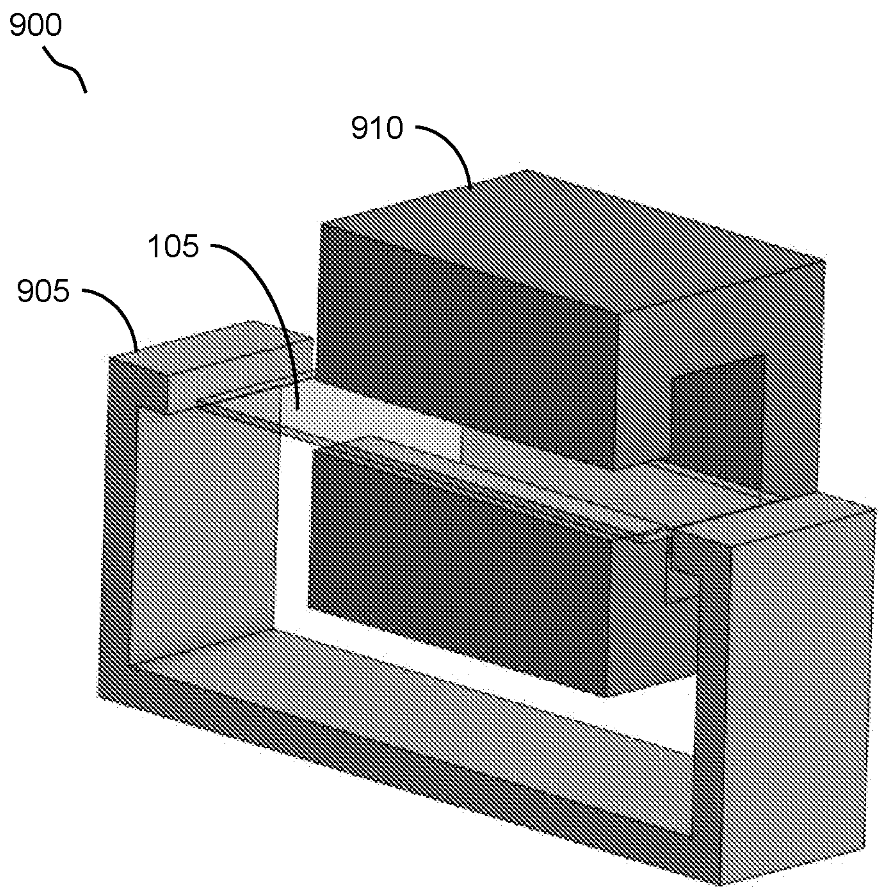
FIG. 19 and FIG. 20 illustrate perspective views of examples of electromagnet-based actuation mechanisms including one or more C- or U-shaped electromagnets, which is yet another example of the presently disclosed magnetic-based actuation mechanism.
Figure 20:
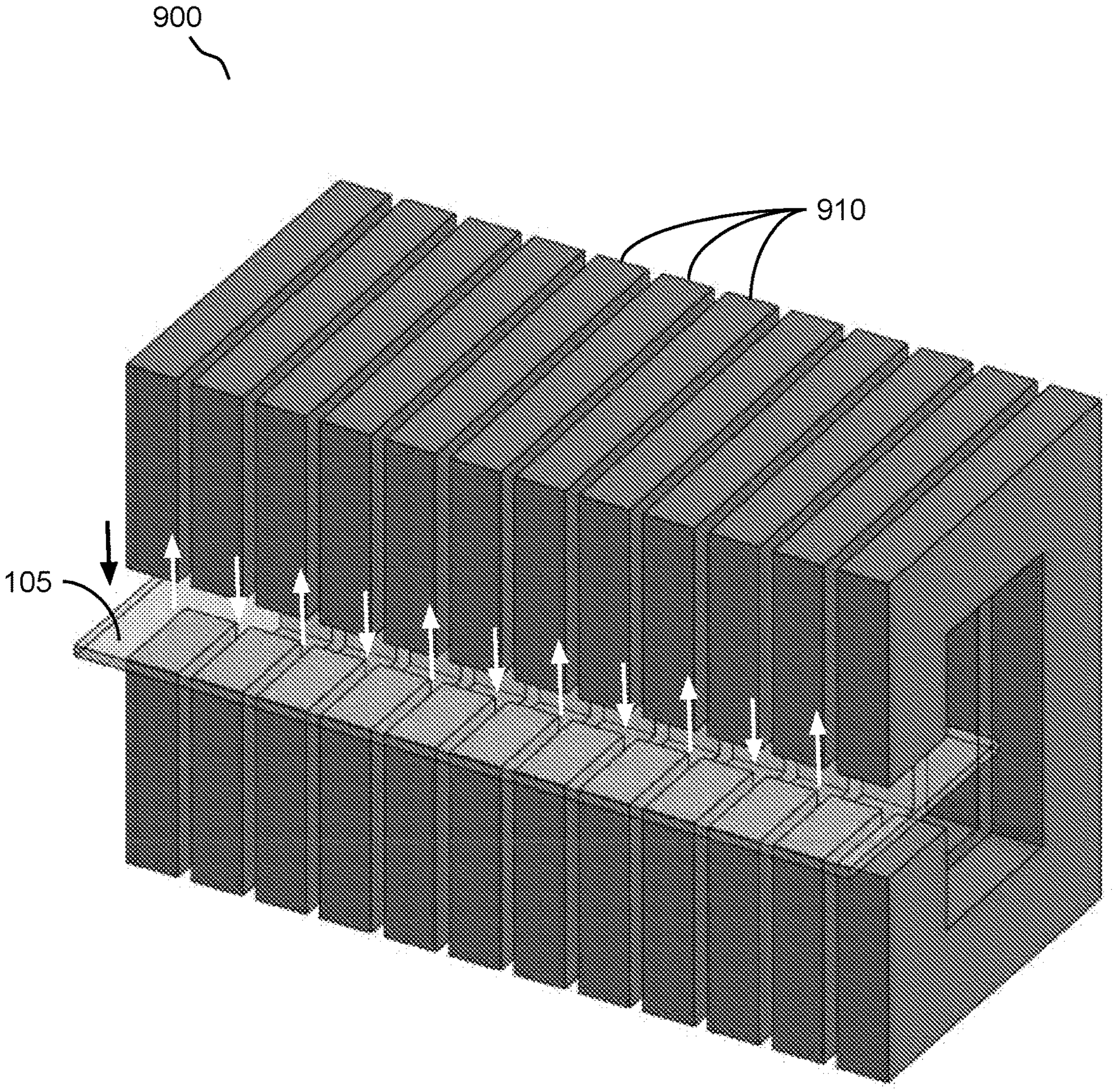

In yet other embodiments, magnetic actuation mechanism 150 is one or more C- or U-shaped electromagnets in relation to microfluidics device 105 with the magnetically-responsive surface-attached microposts 122 (see FIG. 19 and FIG. 20). For example, the one or more C- or U-shaped electromagnets can be pulsed in a pattern to induce motion in the magnetically-responsive surface-attached microposts 122.

In yet other embodiments, magnetic shielding may be used to control the actuation force of the presently disclosed magnetic-based actuation mechanisms (see FIG. 21 through FIG. 23), wherein the magnetic shielding is arranged in a plane between the magnet and the plane of the magnetically-responsive microposts and wherein the magnetic shielding is moveable for either allowing the magnetic field of the magnet to reach the magnetically-responsive microposts or blocking the magnetic field of the magnet from reaching the magnetically-responsive microposts.

In any of the magnet configurations described hereinabove and/or hereinbelow, magnetic actuation mechanism 150 may be configured to provide various magnetic field geometries that are movable relative to the magnetically-responsive microposts 122 to create different pumping action in reaction chamber 114.

In any of the magnet configurations described hereinabove and/or hereinbelow, magnetic actuation mechanism 150 may be configured to actuate the magnetically-responsive surface-attached microposts 122 in certain beat patterns, such as synchronized beat patterns and/or metachronal beat patterns.

Further, in any of the magnet configurations described hereinabove and/or hereinbelow, magnetic actuation mechanism 150 may include drive mechanisms, such as, but not limited to, miniature-sized brushed and brushless DC motors (not shown); 1D, 2D, and 3D motorized linear translation stages (not shown), and the like.

Figure 2A:
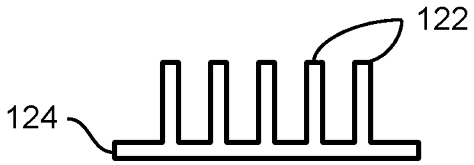
FIG. 2A and FIG. 2B illustrate side views of an example of microposts of the microfluidics device.
Figure 2B:
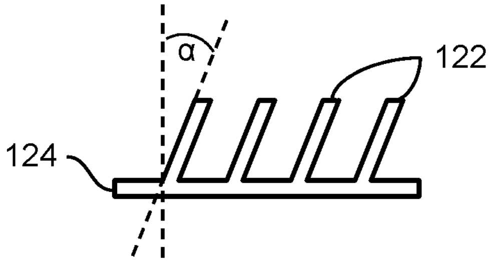

Referring now to FIG. 2A and FIG. 2B are side views of an example of microposts 122 of microfluidics device 105, wherein microposts 122 can be arranged in a micropost field or array. The term "micropost field" or "micropost array" is herein used to describe a field or an array of small posts, extending outwards from a substrate, that typically range from 1 to 100 micrometers in height. In one embodiment, microposts of a micropost field or array may be vertically-aligned. Notably, each micropost includes a proximal end that is attached to the substrate base and a distal end or tip that is opposite the proximal end. Accordingly, an arrangement of microposts 122 are provided on a substrate 124.

Microposts 122 and substrate 124 can be formed, for example, of polydimethylsiloxane (PDMS). The length, diameter, geometry, orientation, and pitch of microposts 122 in the field or array can vary. For example, the length of microposts 122 can vary from about 1 μm to about 100 μm. The diameter of microposts 122 can vary from about 0.1 μm to about 10 μm. Further, the cross-sectional shape of microposts 122 can vary. For example, the cross-sectional shape of microposts 122 can be circular, ovular, square, rectangular, triangular, and so on. The orientation of microposts 122 can vary. For example, FIG. 2A shows microposts 122 oriented substantially normal to the plane of substrate 124, while FIG. 2B shows microposts 122 oriented at an angle α with respect to normal of the plane of substrate 124. In a neutral position with no actuation force applied, the angle α can be, for example, from about 0 degrees to about 45 degrees. Additionally, the pitch of microposts 122 within a micropost field or array can vary, for example, from about 0 μm to about 50 μm. Further, the relative positions of microposts 122 within the micropost field or array can vary.

Figure 3A:
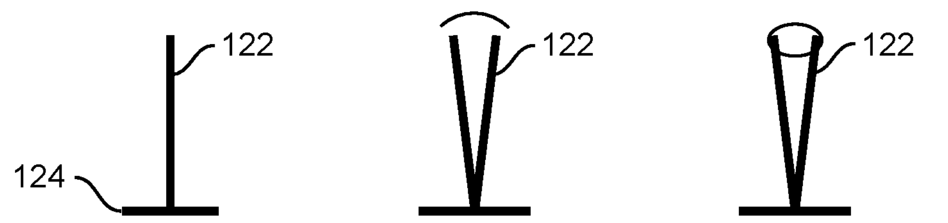
FIG. 3A and FIG. 3B illustrate side views of a micropost and show examples of the actuation motion thereof.
Figure 3B:
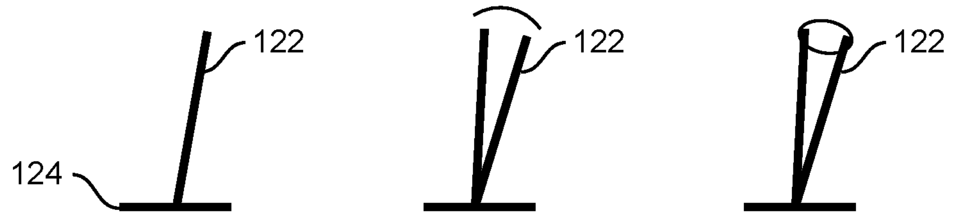

FIG. 3A and FIG. 3B illustrate sides views of a micropost 122 and show examples of the actuation motion thereof. For example, FIG. 3A shows an example of a micropost 122 oriented substantially normal to the plane of substrate 124 (see FIG. 2A). FIG. 3A shows that the distal end of the micropost 122 can move (1) with side-to-side 2D motion only with respect to the fixed proximal end or (2) with circular (or conical) motion with respect to the fixed proximal end, which is a cone-shaped motion. By contrast, FIG. 3B shows an example of a micropost 122 oriented at an angle with respect to the plane of substrate 124 (see FIG. 2B). FIG. 3B shows that the distal end of the micropost 122 can move (1) with tilted side-to-side 2D motion only with respect to the fixed proximal end or (2) with tilted circular motion with respect to the fixed proximal end, which is a tilted cone-shaped motion (or tilted conical motion). In microfluidics device 105, by actuating microposts 122 and causing motion thereof, any fluid in reaction chamber 114 is in effect stirred or caused to flow or circulate within reaction chamber 114 and across the surface area thereof, as shown, for example, in FIG. 5. Further, the cone-shaped motion of micropost 122 shown in FIG. 3A, as well as the tilted cone-shaped motion of micropost 122 shown in FIG. 3B, can be achieved using a rotating magnetic field. A rotating magnetic field is one example of actuation force 152 of magnetic actuation mechanism 150.

Referring still to FIG. 1 through FIG. 3B, microposts 122 are based on, for example, the microposts described in the U.S. Pat. No. 9,238,869, entitled "Methods and systems for using actuated surface-attached posts for assessing biofluid rheology," issued on Jan. 19, 2016. The '869 patent describes methods, systems, and computer readable media for using actuated surface-attached posts for assessing biofluid rheology. According to one aspect, a method of the '869 patent for testing properties of a biofluid specimen includes placing the specimen onto a micropost array having a plurality of microposts extending outwards from a substrate, wherein each micropost includes a proximal end attached to the substrate and a distal end opposite the proximal end, and generating an actuation force in proximity to the micropost array to actuate the microposts, thereby compelling at least some of the microposts to exhibit motion.

In one example, according to the '869 patent, microposts 122 and substrate 124 can be formed of PDMS. Further, microposts 122 may include a flexible body and a metallic component disposed on or in the body, wherein application of a magnetic or electric field actuates microposts 122 into movement relative to the surface to which they are attached. Again, in microfluidics system 100, the actuation force generated by magnetic actuation mechanism 150 is a magnetic actuation force.

Figure 4A:
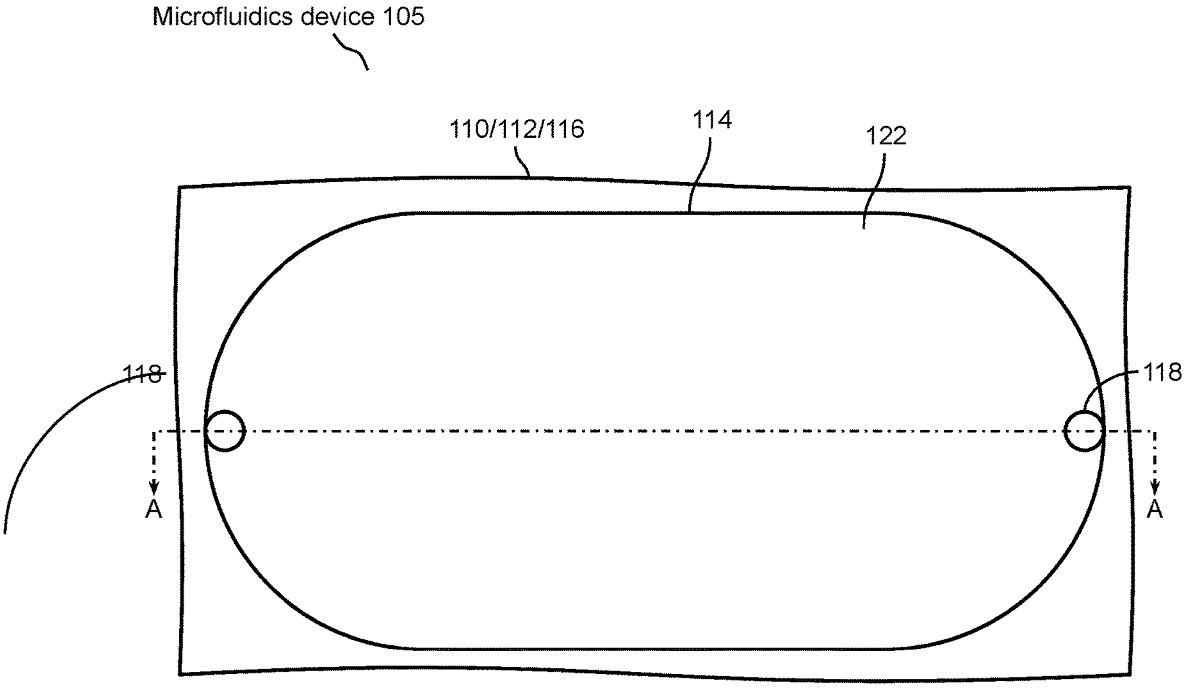
FIG. 4A and FIG. 4B illustrate a plan view and a cross-sectional view, respectively, of an example of the microfluidics device of the microfluidics system shown in FIG. 1, wherein the microfluidics device has a reaction (or assay) chamber that includes a field of microposts.
Figure 4B:
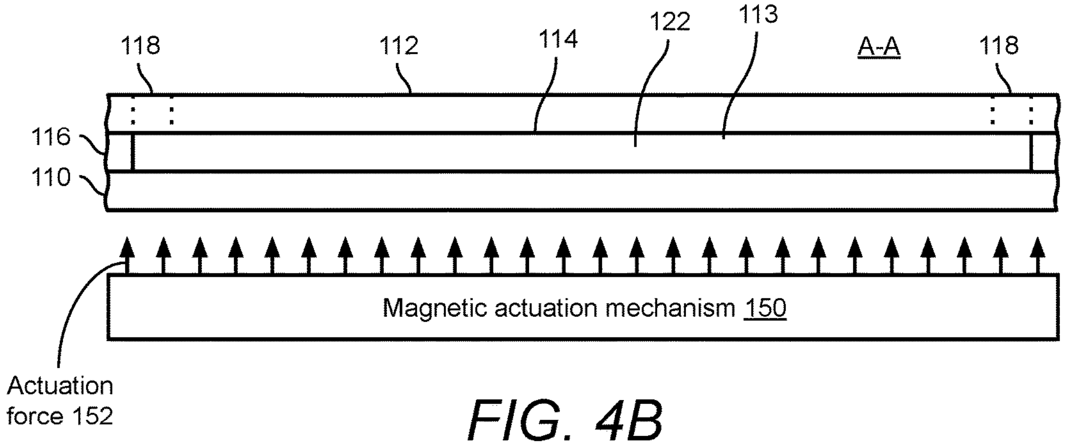

Referring now to FIG. 4A and FIG. 4B is a plan view and a cross-sectional view, respectively, of an example of microfluidics device 105 of microfluidics system 100 shown in FIG. 1. The cross-sectional view of FIG. 4B is taken along line A-A of FIG. 4A. Additionally, FIG. 4B shows microfluidics device 105 in relation to magnetic actuation mechanism 150, which is one example of the presently disclosed magnetic-based actuation mechanisms.

As shown in FIG. 4A and FIG. 4B, microfluidics device 105 has reaction chamber 114 that includes a field of magnetically-responsive microposts 122. For example, microfluidics device 105 includes a bottom substrate 110 and a top substrate 112 separated by a gap 113, thereby forming reaction (or assay) chamber 114 between bottom substrate 110 and top substrate 112. A spacer or gasket 116 may be provided between bottom substrate 110 and top substrate 112 to form gap 113 and define the area of reaction chamber 114. Bottom substrate 110 and top substrate 112 can be formed, for example, of plastic or glass. Loading ports 118 are provided, for example, in top substrate 112. For example, two loading ports 118 are provided, one at each end (e.g., an inlet and an outlet) for loading liquid into reaction chamber 114 and/or for venting. In this example, microfluidics device 105 provides a simple "flow cell" type of chamber. For example, a flow cell can be any chamber comprising a solid surface across which one or more liquids can be flowed, wherein the chamber has at least one inlet and at least one outlet. Various fluidic operations, such as, but not limited to, mixing operations, washing operations, binding operations, and cell processing operations, can take place within reaction chamber 114.

Reaction chamber 114 of microfluidics device 105 can be sized to hold any volume of fluid. The height of gap 113 of reaction chamber 114 can be, for example, from about 50 μm to about 1 mm. A field of magnetically-responsive microposts 122 is provided on the inner surface of bottom substrate 110. However, in various embodiments, microposts 122 can be provided on bottom substrate 110 only, top substrate 112 only, or on both bottom substrate 110 and top substrate 112.

FIG. 4B shows magnetic actuation mechanism 150 arranged in close proximity to reaction chamber 114 of microfluidics device 105. In this configuration, microposts 122 are within the magnetic field (not shown) generated by magnetic actuation mechanism 150, wherein the magnetic field is the actuation force that can be used to actuate the magnetically-responsive microposts 122.

Figure 5:
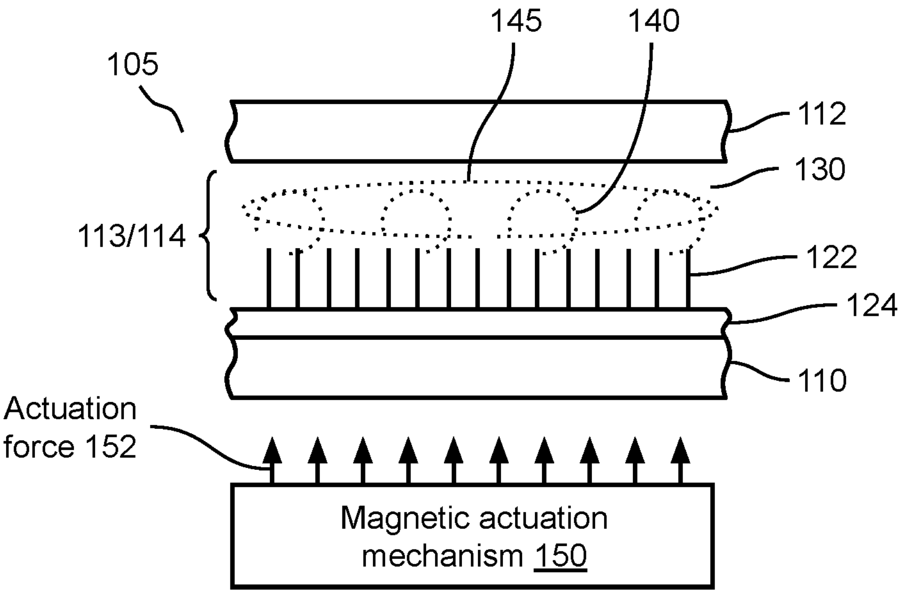
FIG. 5 illustrates a side view of a portion of the microfluidics device, wherein the presently disclosed magnetic-based actuation mechanisms is positioned in relation to the microfluidics device.

By actuating microposts 122 and causing motion thereof, the sample fluid (not shown) in gap 113 is in effect stirred or caused to flow or circulate within gap 113 of reaction chamber 114 as shown, for example, in FIG. 5. For example, FIG. 5 shows a side view of a portion of microfluidics device 105 wherein a sample fluid 130 is provided within gap 113 of reaction chamber 114. In this example, magnetic actuation mechanism 150 is positioned nearest the substrate that includes microposts 122. However, in other configurations (not shown) magnetic actuation mechanism 150 can be positioned nearest the substrate that is opposite microposts 122.

In either configuration, microposts 122 can be actuated into movement via the magnetic actuation force 152 from magnetic actuation mechanism 150. For example, the application of a magnetic field from magnetic actuation mechanism 150 actuates the magnetically-responsive microposts 122 into movement. Then, magnetic actuation mechanism 150 generates actuation force 152 in proximity to the field of microposts 122 that compels at least some of microposts 122 to exhibit motion. In so doing, both regions of local circulation 140 and bulk circulation 145 occur in the sample fluid 130 within reaction chamber 114 of microfluidics device 105. In one example, due to the presence of regions of local circulation 140 and bulk circulation 145 created by the motion of microposts 122 in reaction chamber 114 of microfluidics device 105, the reaction time can be significantly reduced compared with applications that rely on diffusion alone for flow and/or mixing. For example, compared with applications that rely on diffusion alone, microfluidics device 105 and magnetic actuation mechanism 150 can be used to reduce the reaction time from hours or days to a few minutes or seconds only.

Figure 6:
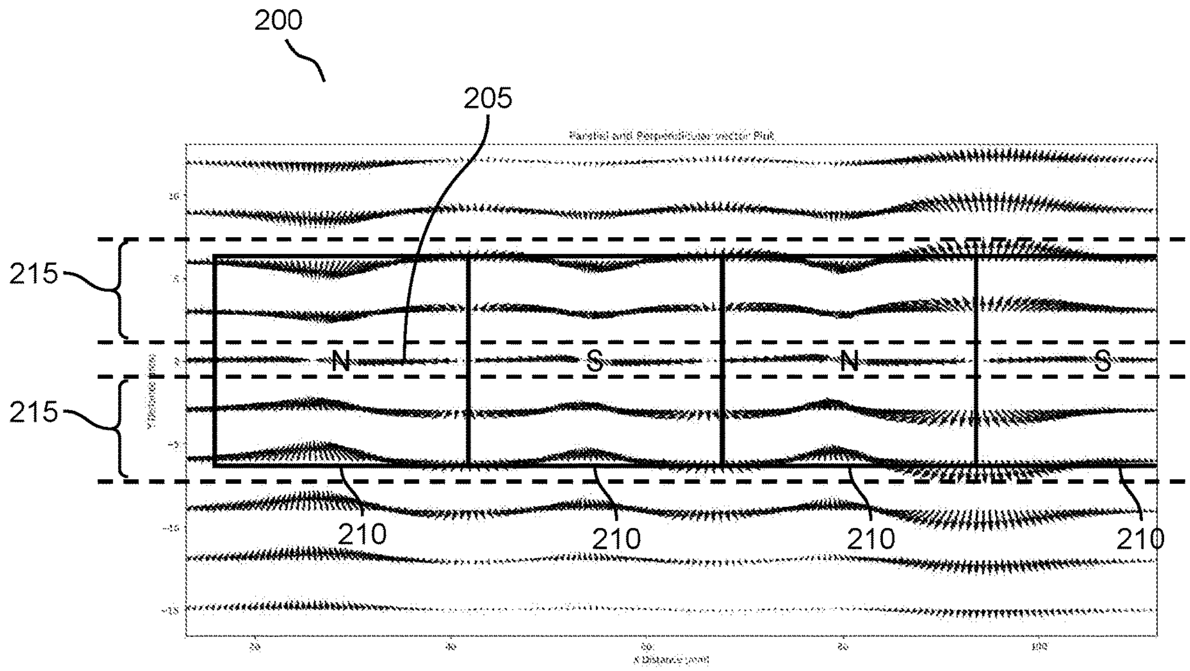
FIG. 6 shows an example of a parallel and perpendicular vector plot of the magnetic field generated by, for example, a set of magnets arranged side-by-side and identifying "pumping zone" portions of the magnetic field.

Referring now to FIG. 6 is an example of a parallel and perpendicular vector plot 200 of the magnetic field generated by, for example, a set of magnets 210 arranged side-by-side and identifying "pumping zone" portions of the magnetic field. At about the center line 205 of the side-by-side magnets 210, the magnetic field is substantially normal to the side magnets 210. When moving magnets 210 side-to-side in relation to, for example, a field of magnetically-responsive microposts 122, this type of magnetic field is suitable to induce side-to-side motion in microposts 122. For example, the side-to-side 2D motion shown in FIG. 3A and/or the tilted side-to-side 2D motion shown in FIG. 3B. In other words, any magnetically-responsive microposts 122 at about center line 205 will have a substantially side-to-side beat pattern. However, inducing this type of motion or pattern in microposts 122 is not optimal for producing pumping action in, for example, sample fluid 130 in reaction chamber 114 of microfluidics device 105.

By contrast, the magnetic field that is slightly off center and slightly beyond the edge of the side-by-side magnets 210 is not normal to the side magnets 210. Rather, the magnetic field splays out at various angles, which is suitable to induce motion in magnetically-responsive microposts 122 that is, for example, the circular (or conical) motion shown in FIG. 3A and/or the tilted cone-shaped motion (or tilted conical motion) shown in FIG. 3B. This type of motion is optimal for producing pumping action in reaction chamber 114 via the actuated microposts 122. Accordingly, the portions of the magnetic field that is slightly off center and slightly beyond the edge of the side-by-side magnets 210 can be called the pumping zones 215. That is, any magnetically-responsive microposts 122 at about the pumping zones 215 will have a tilted conical beat pattern. Inducing the tilted conical beat pattern in microposts 122 is optimal for producing good pumping action in, for example, sample fluid 130 in reaction chamber 114 of microfluidics device 105.

More details of examples of the presently disclosed magnetic-based actuation mechanisms that can produce the tilted conical beat pattern in, for example, the magnetically-responsive microposts 122 of microfluidics device 105 of microfluidics system 100 are shown and described hereinbelow with reference to FIG. 7 through FIG. 25.

Referring now to FIG. 7 is an end view, a side view, and a schematic view of an example of a carousel-like magnetic-based actuation mechanism 300 that is rotatable, which is one example of the presently disclosed magnetic-based actuation mechanism. In this example, carousel-like magnetic-based actuation mechanism 300 includes one set of arc-shaped magnets 310 arranged on an axis 312, which is the axis of rotation. In this example, the arc-shaped magnets 310 are arranged in an alternating polarity configuration. Further, in a carousel-like configuration, microfluidics device 105 is positioned substantially tangential with respect to the rotatable arc-shaped magnets 310, as shown in FIG. 7. Further, microfluidics device 105 is arranged a small distance away such that it is within the magnetic field of arc-shaped magnets 310. When operating, carousel-like magnetic-based actuation mechanism 300 rotates in relation to microfluidics device 105.

Carousel-like magnetic-based actuation mechanisms 300 can include any number of sets of arc-shaped magnets 310, examples of which are shown in FIG. 8A, FIG. 8B, FIG. 8C, FIG. 8D, and FIG. 8E. Referring now to FIG. 8A, FIG. 8B, FIG. 8C, FIG. 8D, and FIG. 8E is end views of other examples of carousel-like magnetic-based actuation mechanisms 300 that are rotatable. For example, FIG. 8A shows carousel-like magnetic-based actuation mechanism 300 including two sets of arc-shaped magnets 310 mounted in a concentric relationship about axis 312. In this example, the two sets of arc-shaped magnets 310 are arranged side-by-side with alternating polarity (i.e., fully out of phase). FIG. 8B shows carousel-like magnetic-based actuation mechanism 300 including two sets of arc-shaped magnets 310 mounted on axis 312. In this example, the two sets of arc-shaped magnets 310 are arranged side-by-side with the same polarity (i.e., fully in phase). FIG. 8C shows carousel-like magnetic-based actuation mechanism 300 including two sets of arc-shaped magnets 310 mounted on axis 312. In this example, the two sets of arc-shaped magnets 310 are arranged side-by-side with shifted polarity (i.e., partially out of phase). FIG. 8D shows carousel-like magnetic-based actuation mechanism 300 including five sets of arc-shaped magnets 310 mounted on axis 312. In this example, the five sets of arc-shaped magnets 310 are arranged side-by-side with the same polarity (i.e., fully in phase).

The number of sets of arc-shaped magnets 310 in carousel-like magnetic-based actuation mechanism 300 is not limited to those shown in FIG. 7, FIG. 8A, FIG. 8B, FIG. 8C, FIG. 8D, and FIG. 8E. These are exemplary only. Carousel-like magnetic-based actuation mechanism 300 can include any number of sets of arc-shaped magnets 310. Further, each of the sets of arc-shaped magnets 310 can be provided with any polarity.

Referring now to FIG. 9 is an end view showing more details of the carousel-like magnetic-based actuation mechanisms 300 shown in FIG. 7 through FIG. 8E. Examples of features, characteristics, and/or operating parameters of carousel-like magnetic-based actuation mechanisms 300 that are variable may include, but is not limited to, the following: (1) the outside diameter (O.D) and inside diameter (I.D) of the arc-shaped magnets; (2) the angle α of the arc-shaped magnets, (3) the number of arc-shaped magnets, (4) the grade of the arc-shaped magnets (i.e., N42, the field strength); (5) the magnet configuration (NN/NS); (6) the speed (RPM); (7) the distance of the carousel-like magnetic-based actuation mechanism 300 from the magnetically-responsive microposts 122; and (8) whether magnetic shielding is present or not.

Figure 10A:
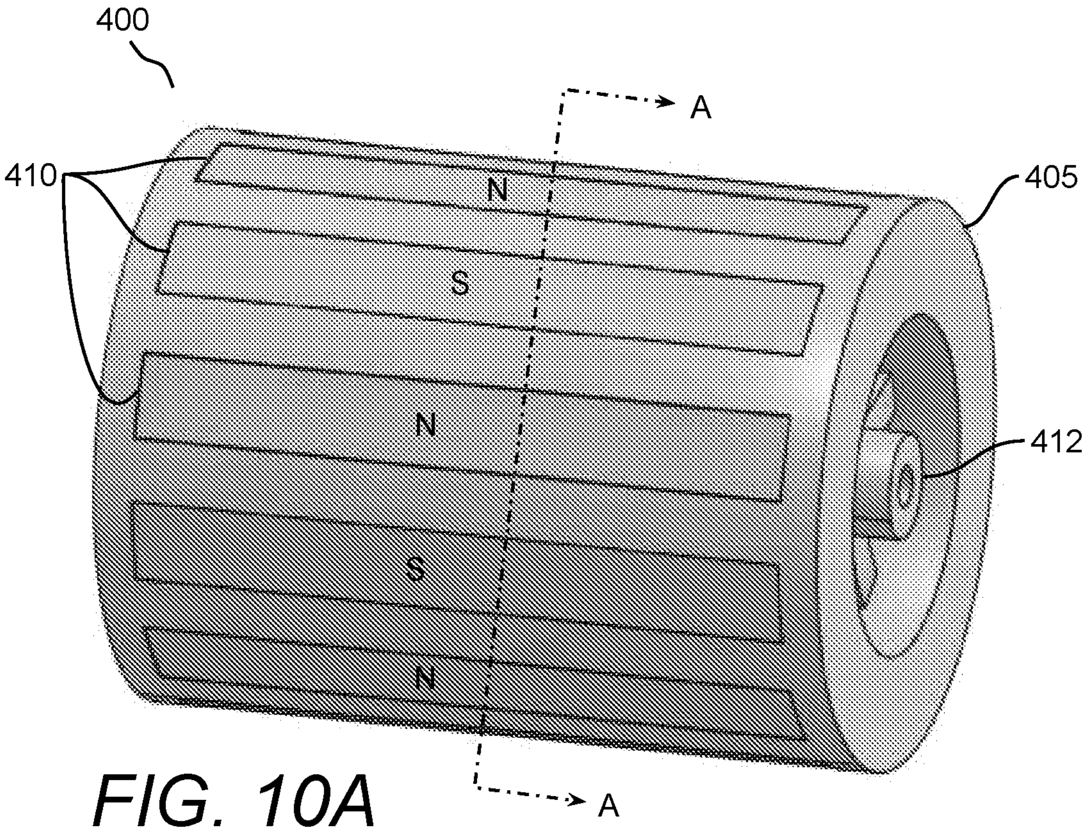
FIG. 10A and FIG. 10B illustrate a perspective view and a cross-sectional view, respectively, of yet another example of a carousel-like magnetic-based actuation mechanism that is rotatable, which is another example of the presently disclosed magnetic-based actuation mechanism.
Figure 10B:
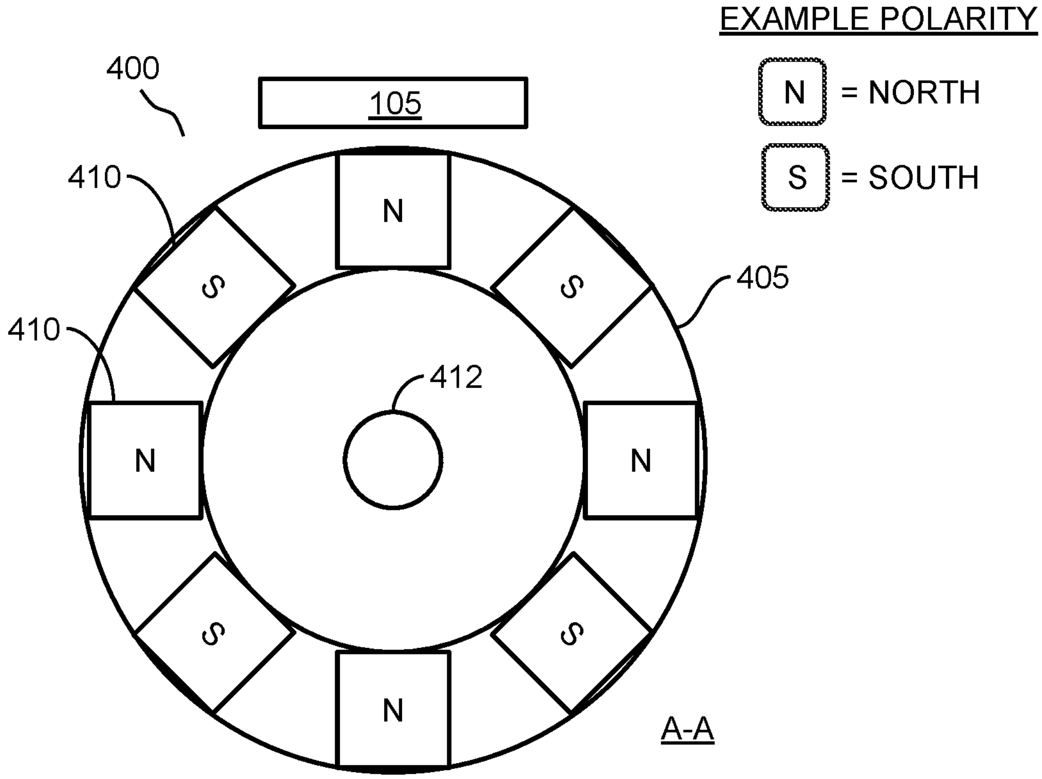

Referring now to FIG. 10A and FIG. 10B is a perspective view and a cross-sectional view, respectively, of an example of a carousel-like magnetic-based actuation mechanism 400 that is rotatable, which is another example of the presently disclosed magnetic-based actuation mechanism. Carousel-like magnetic-based actuation mechanism 400 a carousel housing 405 that is cylinder-shaped. A set of magnet lines (or stripes) 410 is arranged around the circumference of carousel housing 405. In one example, eight magnet lines 410 are arranged on carousel housing 405. Further, microfluidics device 105 is positioned substantially tangential with respect to carousel housing 405, as shown in FIG. 10B. Further, microfluidics device 105 is arranged a small distance away such that it is within the magnetic field of magnet lines 410. When operating, carousel-like magnetic-based actuation mechanism 400 rotates in relation to microfluidics device 105.

Figure 11A:
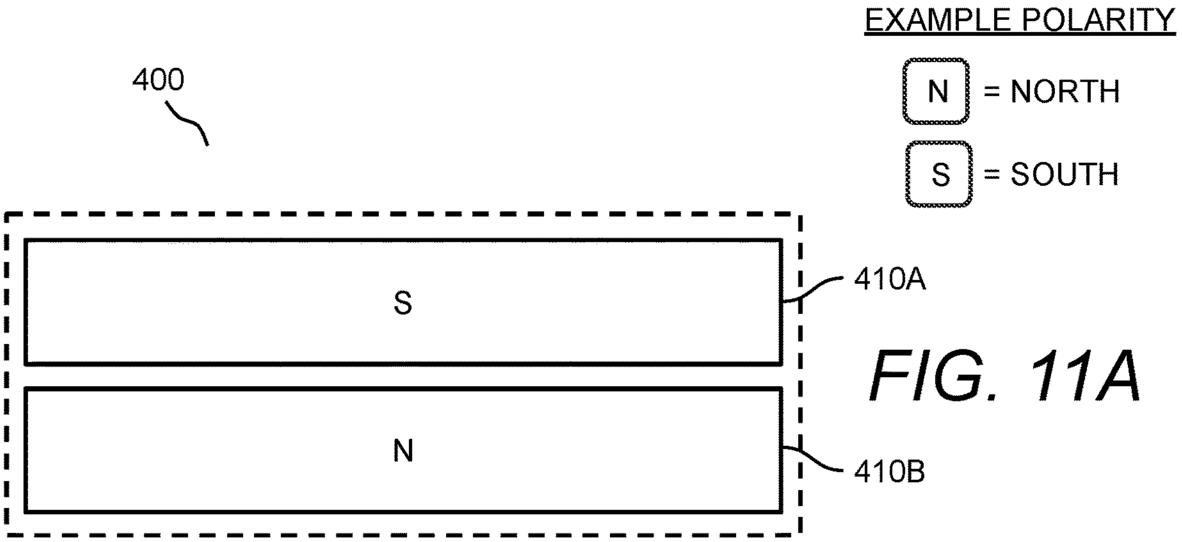
FIG. 11A, FIG. 11B, FIG. 11C, FIG. 11D, FIG. 11E, and FIG. 11F illustrate plan views of examples of magnet configurations of the carousel-like magnetic-based actuation mechanism shown in FIG. 10A and FIG. 10B.
Figure 11B:
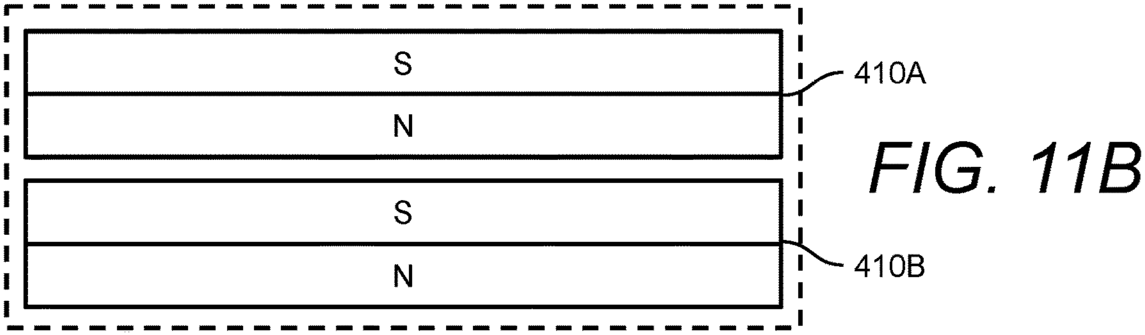
Figure 11C:
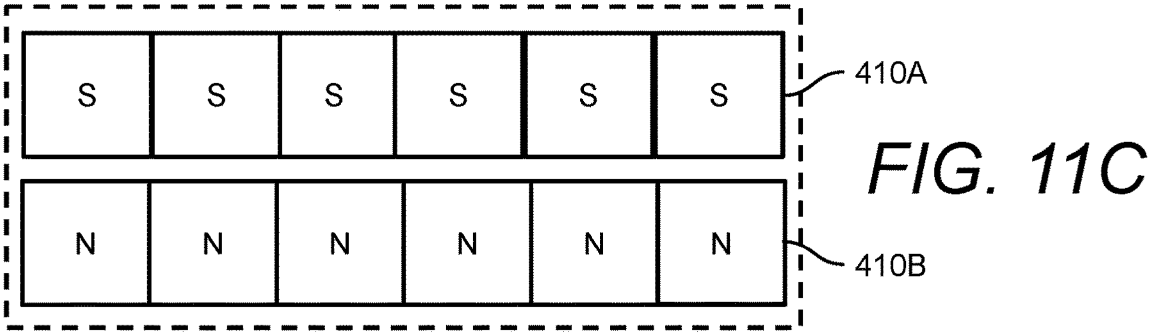
Figure 11D:
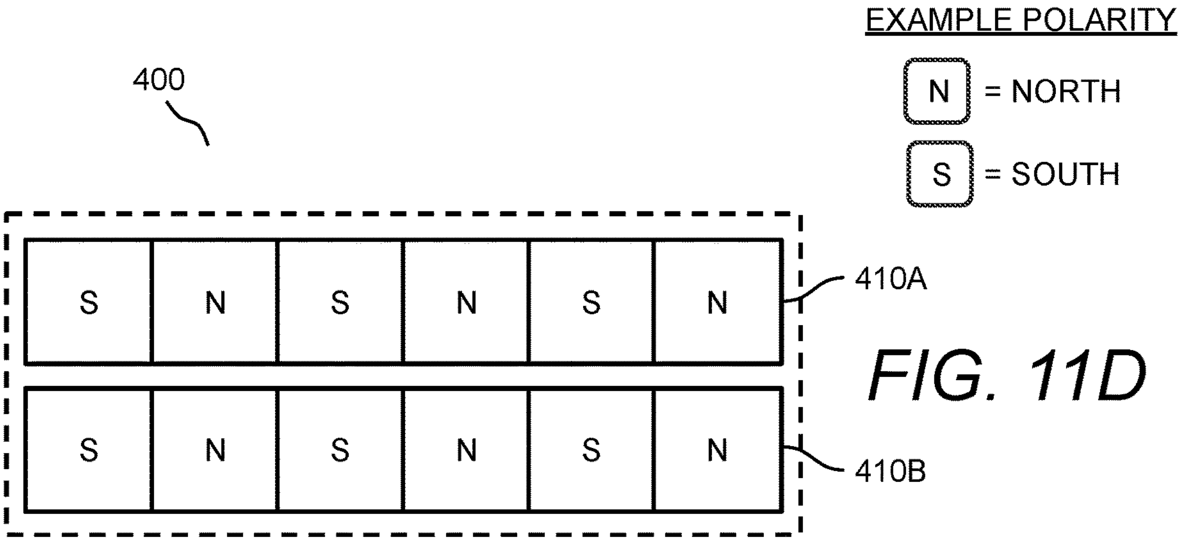
Figure 11E:
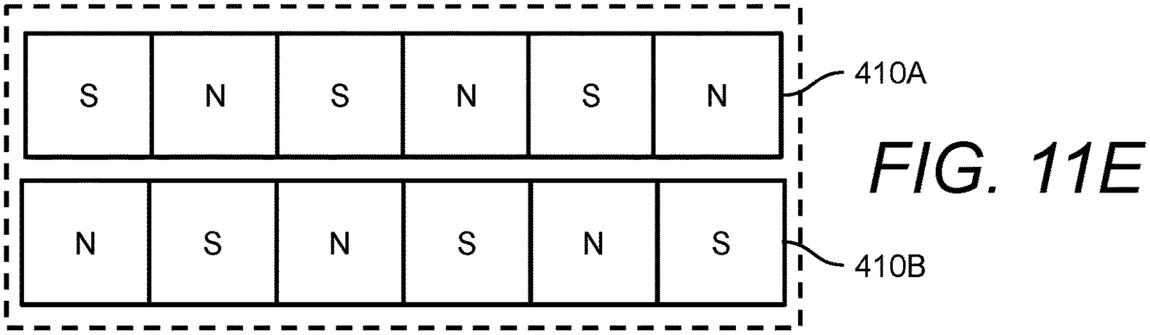
Figure 11F:
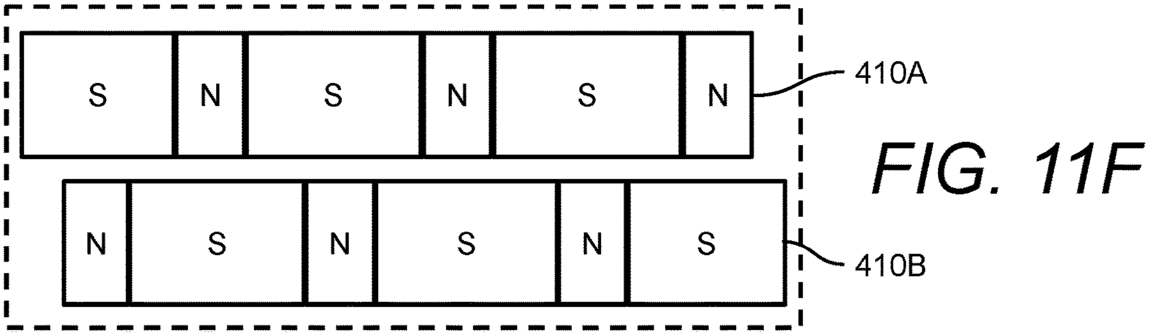

Each magnet line 410 can include one or more magnets in any configurations. For example, FIG. 11A, FIG. 11B, FIG. 11C, FIG. 11D, FIG. 11E, and FIG. 11F shows plan views of examples of magnet configurations of the carousel-like magnetic-based actuation mechanism 400 shown in FIG. 10A and FIG. 10B. For example, FIG. 11A shows two magnet lines 410 (e.g., 410A, 410B), wherein magnet line 410A holds a full-length magnet of one polarity (e.g., S) and magnet line 410B holds a full-length magnet of the opposite polarity (e.g., N). In FIG. 11B, each of the magnet lines 410A and 410B holds a pair of full-length magnets of opposite polarity (e.g., SN). In FIG. 11C, magnet line 410A holds a line of six magnets of one polarity (e.g., SSSSSS) and magnet line 410B holds a line of six magnets of the opposite polarity (e.g., NNNNNN). In FIG. 11D, magnet line 410A holds a line of six magnets configured with alternating polarities (e.g., SNSNSN) and magnet line 410B holds a line of six magnets configured with alternating polarities (e.g., SNSNSN). Further, magnet lines 410A and 410B are configured in phase with one another. In FIG. 11E, magnet line 410A holds a line of six magnets configured with alternating polarities (e.g., SNSNSN) and magnet line 410B holds a line of six magnets configured with alternating polarities (e.g., NSNSNS). Further, magnet lines 410A and 410B are configured out of phase with one another. In FIG. 11F, magnet line 410A holds a line of six magnets configured with alternating polarities (e.g., SNSNSN) and magnet line 410B holds a line of six magnets configured with alternating polarities (e.g., NSNSNS). Further, the magnets in magnet lines 410A and 410B may vary in width and are configured partially out of phase with one another. Additionally, the configurations of magnet lines 410 shown in FIG. 11A, FIG. 11B, FIG. 11C, FIG. 11D, FIG. 11E, and FIG. 11F are exemplary only. Other configurations are possible.

Figure 12:
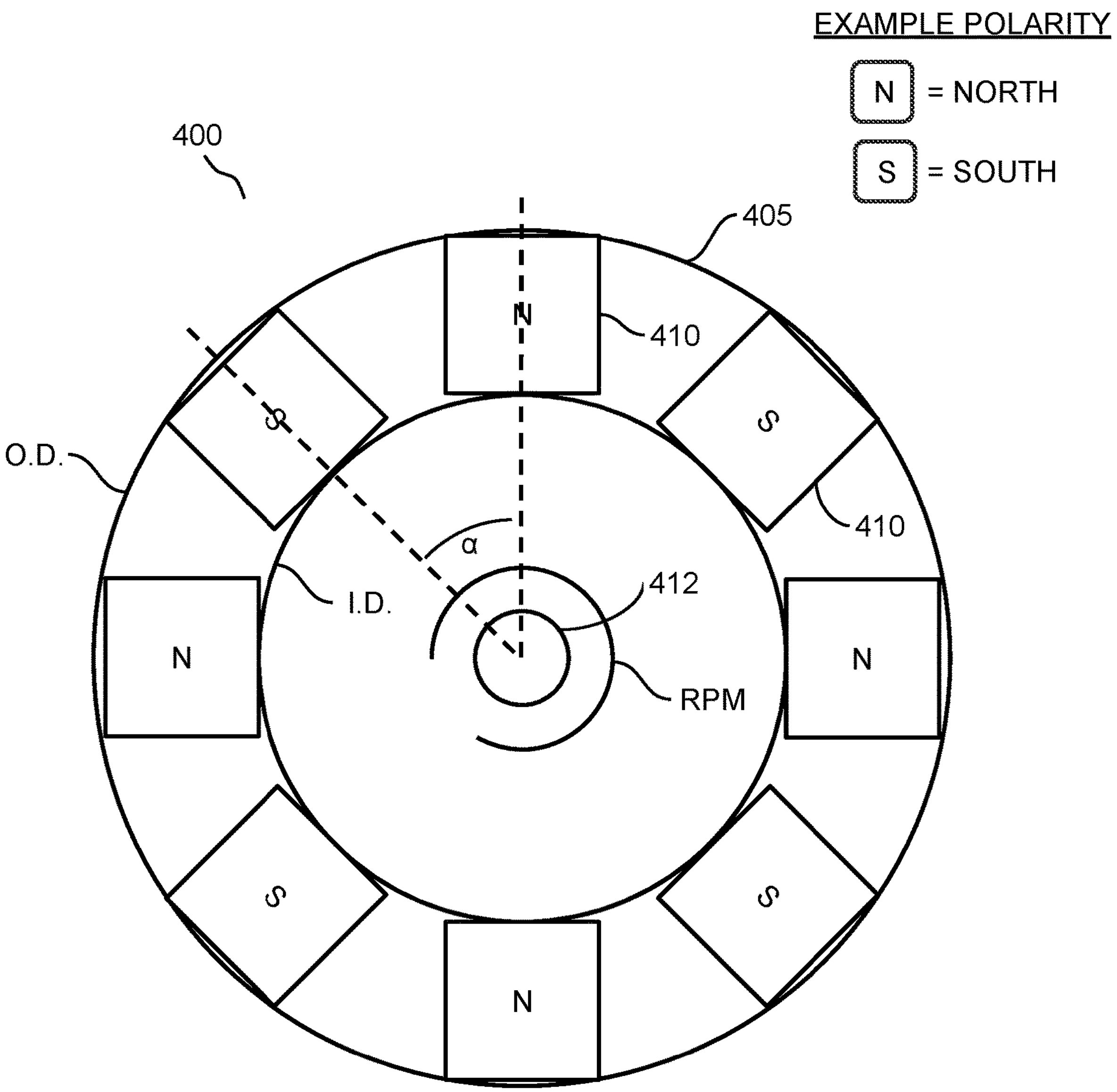
FIG. 12 illustrates an end view showing more details of the carousel-like magnetic-based actuation mechanism shown in FIG. 10A and FIG. 10B.

Referring now to FIG. 12 is an end view showing more details of the carousel-like magnetic-based actuation mechanism 400 shown in FIG. 10A and FIG. 10B. Examples of features, characteristics, and/or operating parameters of carousel-like magnetic-based actuation mechanism 400 that are variable may include, but is not limited to, the following: (1) the outside diameter (O.D) of carousel housing 405; (2) the angle α between magnet lines 410, (3) the number of magnet lines 410, (4) the grade of magnet lines 410 (i.e., N42, the field strength); (5) the magnet configuration/orientation within magnet lines 410 and around carousel housing 405; (6) the size and shape of magnet lines 410; (7) the speed (RPM); (8) the distance of the carousel-like magnetic-based actuation mechanism 400 from the magnetically-responsive microposts 122; and (9) whether magnetic shielding is present or not.

Referring now to FIG. 13 is a plan view and a side view of an example of a disc-like magnetic-based actuation mechanism 500 that is rotatable, which is yet another example of the presently disclosed magnetic-based actuation mechanism. Disc-like magnetic-based actuation mechanism 500 includes a disc plate 505. Disc-like magnetic-based actuation mechanism 500 also includes an arrangement of wedge magnets 510 on disc plate 505. In one example, sixteen wedge magnets 510 are arranged around disc plate 505. In this example, microfluidics device 105 is arranged substantially parallel to the plane of disc plate 505 and a small distance away such that it is within the magnetic field of wedge magnets 510. In this example, the sixteen wedge magnets 510 are configured around disc plate 505 with alternating polarity, but this is a non-limiting example only. When operating disc-like magnetic-based actuation mechanism 500 spins in relation to microfluidics device 105.

Referring now to FIG. 14 is a plan view showing more details of the disc-like magnetic-based actuation mechanism 500 shown in FIG. 13. Examples of features, characteristics, and/or operating parameters of disc-like magnetic-based actuation mechanism 500 that are variable may include, but is not limited to, the following: (1) the outside diameter (O.D) and inside diameter (I.D) of the wedge magnets; (2) the angle α of the wedge magnets, (3) the number of wedge magnets, (4) the grade of wedge magnets (i.e., N42, the field strength); (5) the magnet configuration (NN/NS); (6) the speed (RPM); (7) the distance of the disc-like magnetic-based actuation mechanism 500 from the magnetically-responsive microposts 122; and (8) whether magnetic shielding is present or not.

Figure 15:
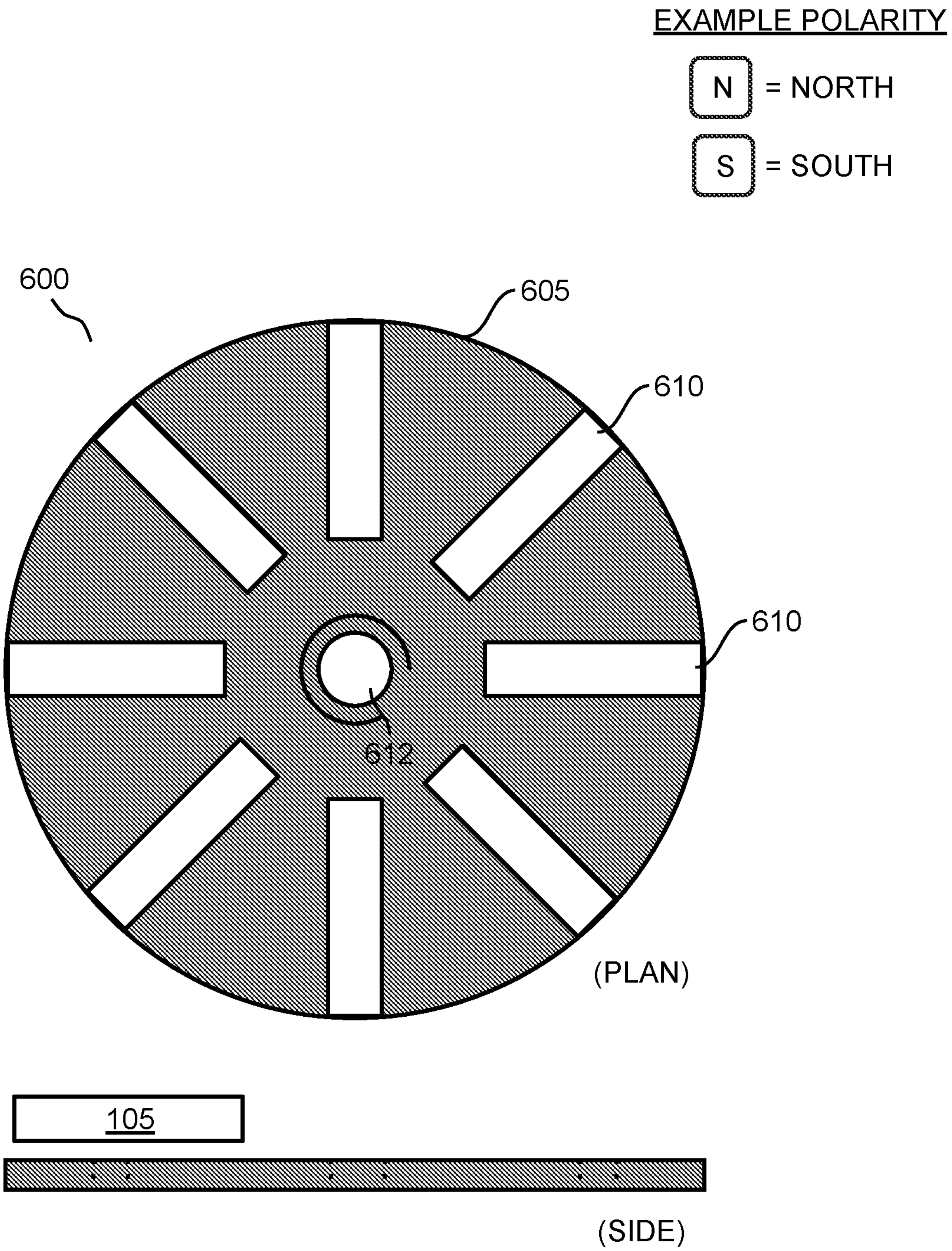
FIG. 15 illustrates a plan view and a side view of another example of disc-like magnetic-based actuation mechanism that is rotatable, which is yet another example of the presently disclosed magnetic-based actuation mechanism.

Referring now to FIG. 15 is a plan view and a side view of an example of disc-like magnetic-based actuation mechanism 600 that is rotatable, which is yet another example of the presently disclosed magnetic-based actuation mechanism. Disc-like magnetic-based actuation mechanism 600 includes a disc plate 605. Disc-like magnetic-based actuation mechanism 600 also includes an arrangement of bar magnets 610 on disc plate 605. In one example, eight bar magnets 610 are arranged around disc plate 605. Again, microfluidics device 105 is arranged substantially parallel to the plane of disc plate 605 and a small distance away such that it is within the magnetic field of bar magnets 610. In this example, the eight bar magnets 610 are configured around disc plate 605 with alternating polarity, but this is a non-limiting example only. When operating disc-like magnetic-based actuation mechanism 600 spins in relation to microfluidics device 105.

Figure 16:
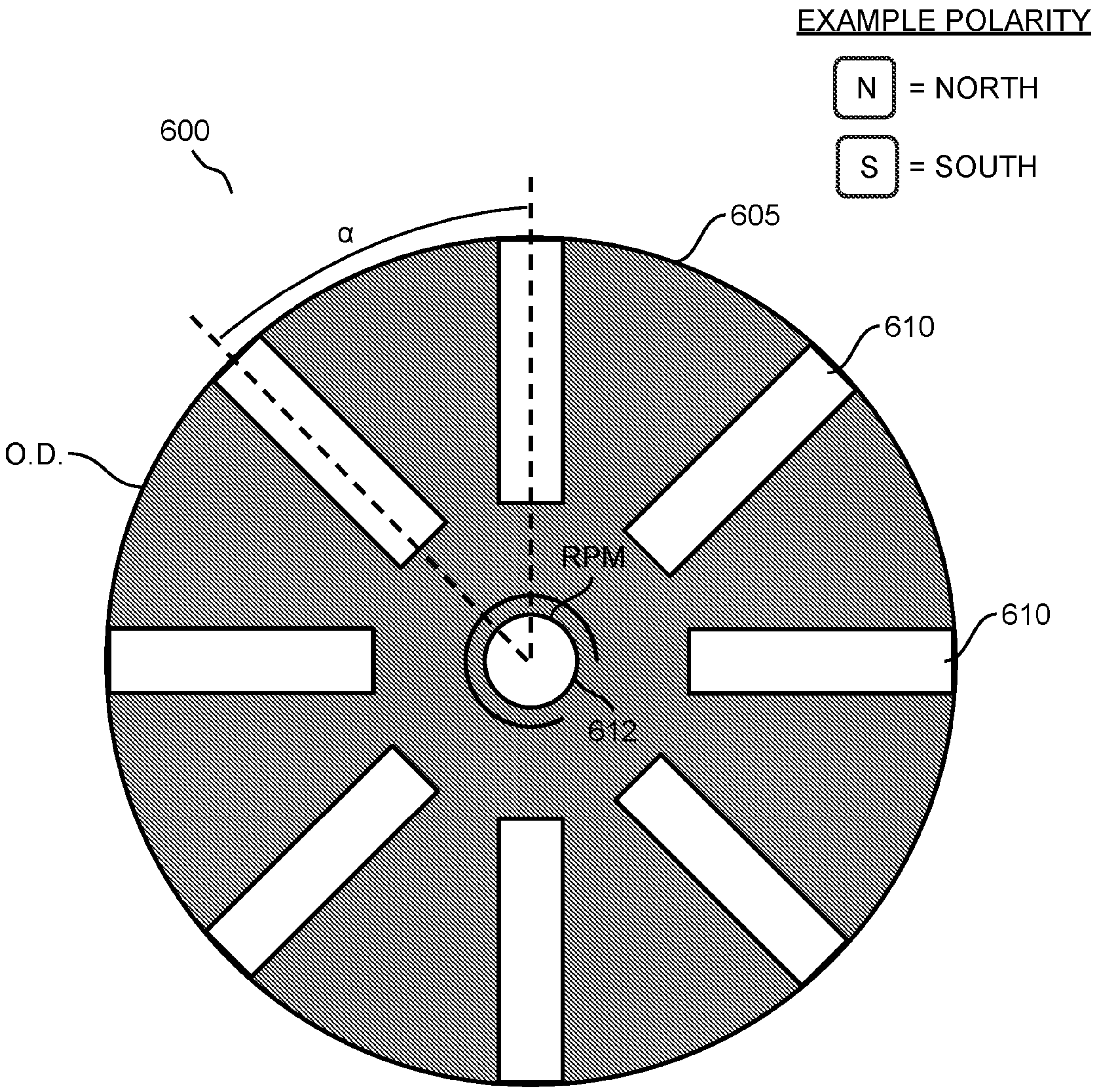
FIG. 16 illustrates a plan view showing more details of the disc-like magnetic-based actuation mechanism shown in FIG. 15.

Referring now to FIG. 16 is a plan view showing more details of the disc-like magnetic-based actuation mechanism 600 shown in FIG. 15. Examples of features, characteristics, and/or operating parameters of disc-like magnetic-based actuation mechanism 600 that are variable may include, but is not limited to, the following: (1) the outside diameter (O.D) of disc plate 605; (2) the angle α between magnets, (3) the number of magnets, (4) the grade of magnets (i.e., N42, the field strength); (5) the magnet configuration/orientation within each line and around disc plate 605; (6) the magnet size and shape, (7) the speed (RPM); (7) the distance of the disc-like magnetic-based actuation mechanism 600 from the magnetically-responsive microposts 122; and (8) whether magnetic shielding is present or not.

Referring now to FIG. 17 is a side view of an example of a conveyor-like magnetic-based actuation mechanism 700, which is yet another example of the presently disclosed magnetic-based actuation mechanism. A benefit of conveyor-like magnetic-based actuation mechanism 700 is that it can be easily sized to handle large-area microfluidic platforms of microfluidics system 100.

Conveyor-like magnetic-based actuation mechanism 700 includes a conveyor apparatus 705. A set of magnets 710 are arranged on the belt of conveyor apparatus 705. Conveyor-like magnetic-based actuation mechanism 700 can include any configurations/orientations of magnets 710. Microfluidics device 105 is positioned substantially parallel to the belt of conveyor apparatus 705 that is holding magnets 710, as shown in FIG. 17. Further, microfluidics device 105 is arranged a small distance away such that it is within the magnetic field of magnets 710. In conveyor-like magnetic-based actuation mechanism 700, magnets 710 move in linear fashion with respect to microfluidics device 105.

Examples of features, characteristics, and/or operating parameters of conveyor-like magnetic-based actuation mechanism 700 that are variable may include, but is not limited to, the following: (1) the length and width of the belt; (2) the number of magnets in X and Y, (3) the grade of magnets (i.e., N42, the field strength); (4) the magnet configuration/orientation along the belt; (5) the speed (RPM); (6) the distance of the conveyor-like magnetic-based actuation mechanism 700 from the magnetically-responsive microposts 122; and (7) whether magnetic shielding is present or not.

Referring now to FIG. 18 is a plan view and a side view of an example of a shaker plate-like magnetic-based actuation mechanism 800, which is yet another example of the presently disclosed magnetic-based actuation mechanism. Shaker plate-like magnetic-based actuation mechanism 800 includes a shaker plate 805 that can hold any arrangement of magnets 810 with any configurations/orientations thereof. In one example, shaker plate 805 holds an array of magnets 810. In this example, microfluidics device 105 is arranged substantially parallel to the plane of shaker plate 805 and a small distance away such that it is within the magnetic field of magnets 810. When operating shaker plate-like magnetic-based actuation mechanism 800 moves in x, y, z in relation to microfluidics device 105.

Shaker plate-like magnetic-based actuation mechanism 800 with its array of magnets 810 can be moved in different patterns. FIG. 18 shows examples of various 2D patterns 850, meaning 2D movement patterns. One 2D pattern 850 is, for example, a simple square movement pattern. Another 2D pattern 850 is, for example, a movement pattern that is straight in X and then angled in Y. Yet another 2D pattern 850 is, for example, a movement pattern that is angled in X and then straight in Y. Still another 2D pattern 850 is, for example, a movement pattern that is angled in both X and Y. FIG. 18 also shows an example of a 3D pattern 852, meaning a 3D movement pattern. In this example, shaker plate-like magnetic-based actuation mechanism 800 can translate laterally along the full length of microfluidics device 105 and wherein microfluidics device 105 is in the magnetic field of magnets 810. Then, shaker plate-like magnetic-based actuation mechanism 800 can be moved a distance away from microfluidics device 105 such that microfluidics device 105 is not in the magnetic field of magnets 810 and translated back in the opposite direction. In this way the magnetic field at microfluidics device 105 varies.

Examples of features, characteristics, and/or operating parameters of shaker plate-like magnetic-based actuation mechanism 800 that are variable may include, but is not limited to, the following: (1) the length and width of the shaker plate 805; (2) the number of magnets in X and Y, (3) the grade of magnets (i.e., N42, the field strength); (4) the magnet configuration/orientation on shaker plate 805; (5) the movement or motion pattern, (6) the speed of movement; (7) the distance of the shaker plate-like magnetic-based actuation mechanism 800 from the magnetically-responsive microposts 122; and (8) whether magnetic shielding is present or not.

Referring now to FIG. 19 is a perspective view of an example of an electromagnet-based actuation mechanism 900 including one C- or U-shaped electromagnet, which is yet another example of the presently disclosed magnetic-based actuation mechanism. For example, electromagnet-based actuation mechanism 900 includes microfluidics device 105 supported in space using a holder 905. Electromagnet-based actuation mechanism 900 also includes a C- or U-shaped electromagnet 910. Using holder 905, microfluidics device 105 is positioned in the gap in of C- or U-shaped electromagnet 910. In this example, C- or U-shaped electromagnet 910 can be pulsed in a pattern to induce motion in magnetically-responsive microposts 122 of microfluidics device 105.

Referring now to FIG. 20 is a perspective view of an example of electromagnet-based actuation mechanism 900 including multiple C- or U-shaped electromagnets 910, which is yet another example of the presently disclosed magnetic-based actuation mechanism. In this example, electromagnet-based actuation mechanism 900 provides a series of C- or U-shaped electromagnets 910 that can be operated with alternating field direction to simulate dragging a single array of magnets along the field of magnetically-responsive microposts 122 in microfluidics device 105.

Examples of features, characteristics, and/or operating parameters of electromagnet-based actuation mechanism 900 that are variable may include, but is not limited to, the following: (1) the size of the electromagnet; (2) the number of electromagnets, (3) the electromagnet configuration/orientation; (4) the electrical pulse pattern and frequency, (5) the distance of the electromagnet-based actuation mechanism 900 from the magnetically-responsive microposts 122; and (6) whether magnetic shielding is present or not.

Referring now again to FIG. 19 and FIG. 20, instead of using C- or U-shaped electromagnets 910, the C- or U-shaped electromagnets 910 may be replaced with C- or U-shaped permanent magnets (not shown) that can be moved in any motion pattern with respect to magnetically-responsive microposts 122 in microfluidics device 105. In this example, the features, characteristics, and/or operating parameters that are variable may include, but is not limited to, the following: (1) the size of the C- or U-shaped permanent magnets; (2) the number of C- or U-shaped permanent magnets, (3) the grade of magnets (i.e., N42, the field strength); (4) the magnet configuration/orientation; (5) the movement or motion pattern, (6) the speed of movement; (7) the distance of the C- or U-shaped permanent magnets from the magnetically-responsive microposts 122; and (8) whether magnetic shielding is present or not.

Figure 21:
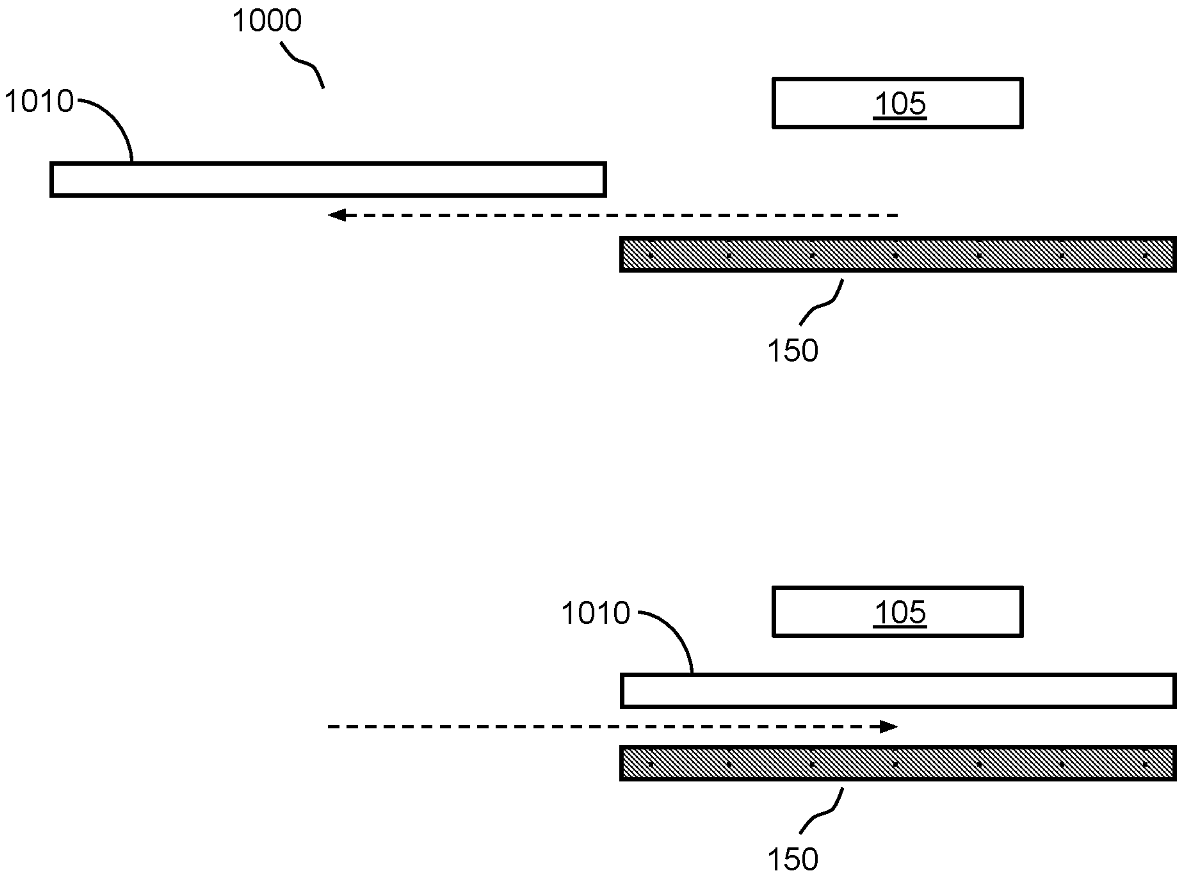
FIG. 21 illustrates side views showing an example of linear magnetic shielding used to control the actuation force of the presently disclosed magnetic-based actuation mechanisms.

Referring now to FIG. 21 is side views showing an example of a linear magnetic shielding configuration 1000 used to control the actuation force of the presently disclosed magnetic-based actuation mechanisms. In this example, linear magnetic shielding configuration 1000 may include a sheet of magnetic shielding 1010 slidably-arranged between microfluidics device 105 and any of the presently disclosed magnetic-based actuation mechanisms described hereinabove with reference to FIG. 7 through FIG. 21. Additionally, magnetic shielding 1010 is arranged substantially parallel to the plane of microfluidics device 105 and any of the presently disclosed magnetic-based actuation mechanisms. Magnetic shielding 1010 may be formed of any magnetic shielding material, such as, for example, a ferromagnetic metal containing iron, nickel, or cobalt, or specialized materials such as Mu-metal, which possess a high nickel content.

In one example of linear magnetic shielding configuration 1000, microfluidics device 105 and the magnetic-based actuation mechanism are held fixed while magnetic shielding 1010 is moveable. In another example of linear magnetic shielding configuration 1000, magnetic shielding 1010 is held fixed while microfluidics device 105 and the magnetic-based actuation mechanism are moveable. When magnetic shielding 1010 is positioned away from microfluidics device 105 and any of the presently disclosed magnetic-based actuation mechanisms, the actuation force is allowed. When magnetic shielding 1010 is positioned between microfluidics device 105 and any of the presently disclosed magnetic-based actuation mechanisms, the actuation force is blocked. Further, in linear magnetic shielding configuration 1000 the rate of movement is variable.

Figure 22:
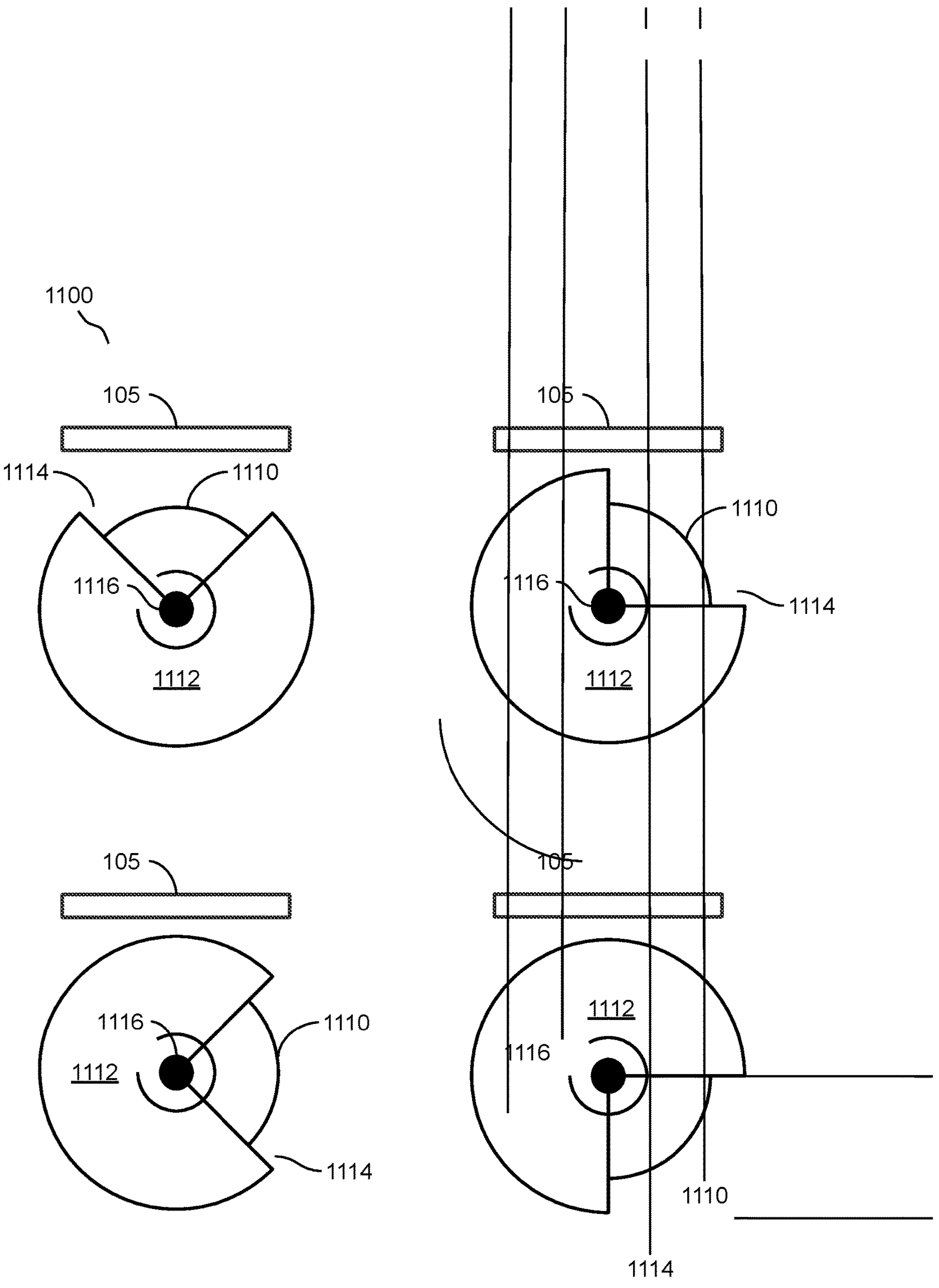
FIG. 22 illustrates end views showing an example of rotatable magnetic shielding used to control the actuation force of the presently disclosed magnetic-based actuation mechanisms.
Figure 23:
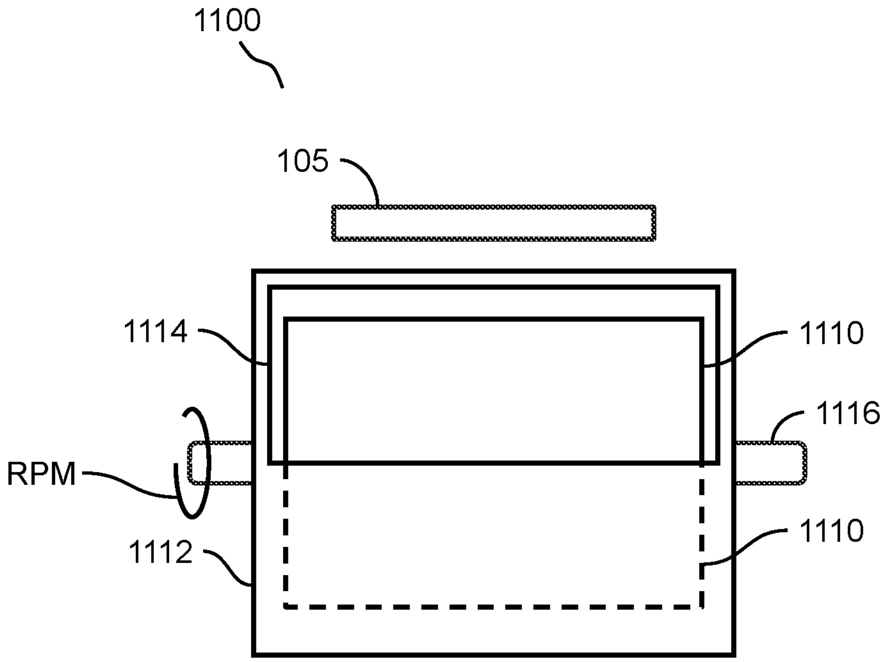
FIG. 23 illustrates a front view showing more details of the rotatable magnetic shielding shown in FIG. 22.

Referring now to FIG. 22 is end views showing an example of rotatable magnetic shielding configuration 1100 used to control the actuation force of the presently disclosed magnetic-based actuation mechanisms. Further, FIG. 23 is a front view showing more details of rotatable magnetic shielding configuration 1100 shown in FIG. 22. Rotatable magnetic shielding configuration 1100 includes permanent magnet 1110 arranged inside a barrel housing 1112 that includes at least one opening 1114. Barrel housing 1112 is arranged on an axis 1116, which is the axis of rotation. Barrel housing 1112 mat be formed of any magnetic shielding material, such as, for example, a ferromagnetic metal containing iron, nickel, or cobalt, or specialized materials such as Mu-metal, which possess a high nickel content. Accordingly, barrel housing 1112 provides a rotatable magnetic shield. Further, permanent magnet 1110 can be any arrangement of one or more permanent magnets in any configurations/orientations.

In rotatable magnetic shielding configuration 1100, permanent magnet 1110 may be held fixed while barrel housing 1112 with its opening 1114 is rotatable. Further, microfluidics device 105 is positioned substantially tangential with respect to permanent magnet 1110 and barrel housing 1112, as shown in FIG. 22. Further, microfluidics device 105 is arranged a small distance away such that it is within the magnetic field of permanent magnet 1110.

In operation, as opening 1114 of barrel housing 1112 rotates in alignment with microfluidics device 105 the actuation force from permanent magnet 1110 is allowed. Then, as opening 1114 rotates away from microfluidics device 105 the actuation force from permanent magnet 1110 is blocked. Further, barrel housing 1112 may include multiple openings 1114. For example, barrel housing 1112 may include a series of slots to induce a certain number of beats per rotation.

Referring still to FIG. 22 and FIG. 23, examples of features, characteristics, and/or operating parameters of rotatable magnetic shielding configuration 1100 that are variable may include, but is not limited to, the following: (1) the size and shape of the rotatable magnetic shield; (2) the size and shape of the magnets, (3) number of the rotatable magnetic shields and/or magnets; (4) the grade of magnets (i.e., N42, the field strength); (5) the magnet/shield configuration/orientation; (6) the speed (RPM); and (7) the distance of the rotatable magnetic shielding configuration 1100 from the magnetically-responsive microposts 122.

Figure 24:
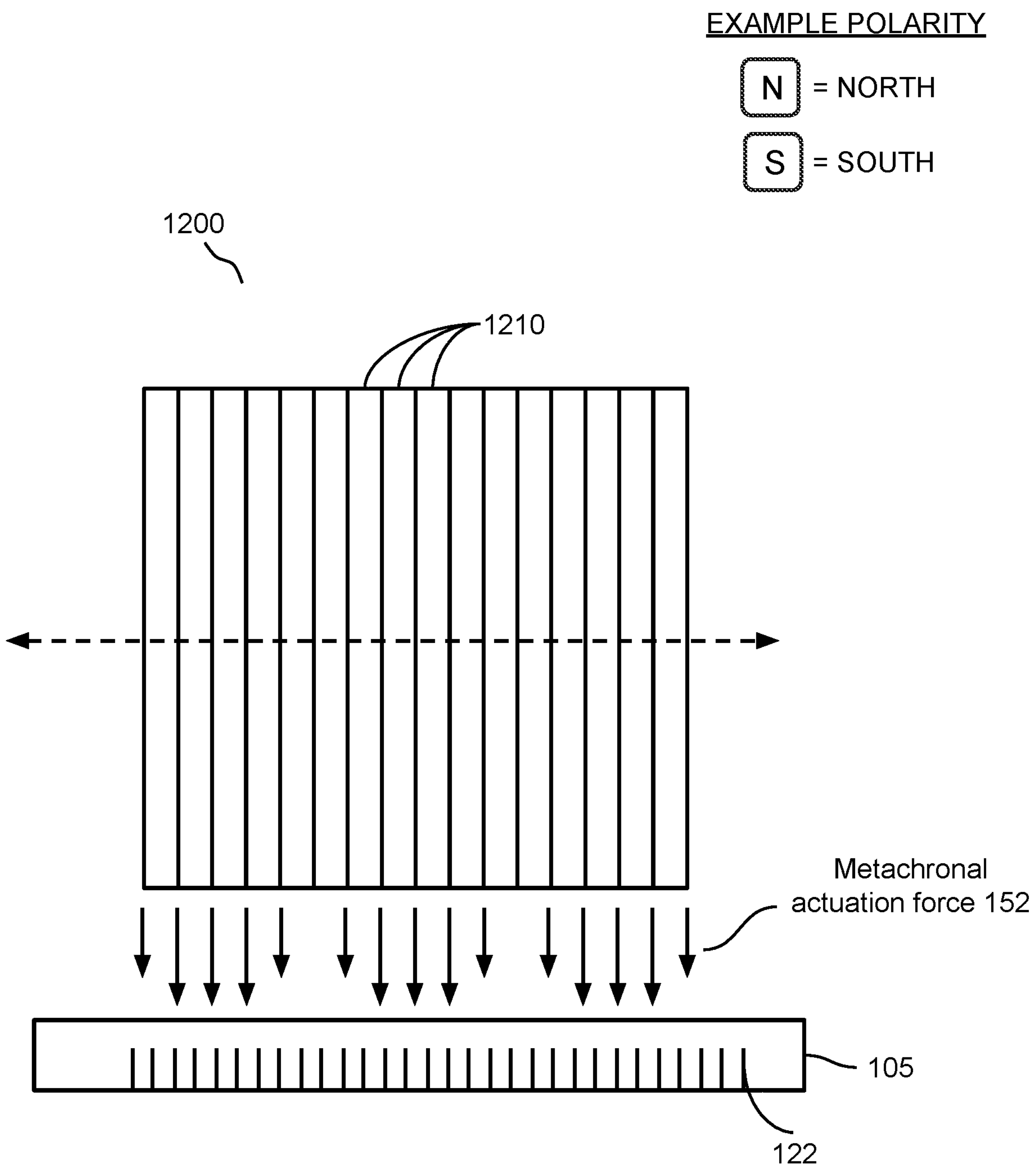
FIG. 24 illustrates a side view of an example of a magnetic-based actuation mechanism including a magnet configuration for providing a metachronal beat pattern.

Referring now to FIG. 24 is a side view of an example of a magnet configuration 1200 for providing a metachronal beat pattern. Magnet configuration 1200 includes a line or series of permanent magnets 1210 with, for example, alternating polarity. However, magnets 1210 can be any arrangement of one or more permanent magnets in any configurations/orientations. In operation, the series of magnets 1210 can be moved back and forth laterally with respect to the field of magnetically-responsive microposts 122 in microfluidics device 105. In this example, the characteristic of magnet configuration 1200 that can induce an actuation force that creates the metachronal beat pattern in magnetically-responsive microposts 122 (e.g., a metachronal actuation force 152) is that the width of each of the magnets 1210 is less than the width of the field of magnetically-responsive microposts 122.

Referring now to FIG. 7 through FIG. 24, the presently disclosed magnetic-based actuation mechanisms (e.g., magnetic actuation mechanisms 150) can be used to apply a directionally-fluctuating and time-varying actuation force 152 to the field of magnetically-responsive microposts 122 to induce motion thereof and therefore induce flow in reaction chamber 114. For example, carousel-like magnetic-based actuation mechanism 300 shown in FIG. 7 through FIG. 9, carousel-like magnetic-based actuation mechanism 400 shown in FIG. 10A through FIG. 12, disc-like magnetic-based actuation mechanism 500 shown in FIG. 13 and FIG. 14, disc-like magnetic-based actuation mechanism 600 shown in FIG. 15 and FIG. 16, conveyor-like magnetic-based actuation mechanism 700 shown in FIG. 17, shaker plate-like magnetic-based actuation mechanism 800 shown in FIG. 18, electromagnet-based actuation mechanisms 900 shown in FIG. 19 and FIG. 20, linear magnetic shielding configuration 1000 shown in FIG. 21, rotating magnetic shielding configuration 1100 shown in FIG. 22 and FIG. 23, and/or magnet configuration 1200 shown in FIG. 24 for generating a metachronal beat pattern can be used to apply a directionally-fluctuating and time-varying actuation force 152 to the field of magnetically-responsive microposts 122 to induce motion thereof and therefore induce flow in reaction chamber 114. All of which are examples of magnetic actuation mechanism 150 of microfluidics system 100 shown in FIG. 1.

Further, these magnetic actuation mechanisms 150 provide various magnetic field geometries that are movable relative to the magnetically-responsive microposts 122 to create different magnetic field pumping actions in a reaction chamber.

Further, these magnetic actuation mechanisms 150 may utilize rotational motion and/or linear motion in any direction. Accordingly, where applicable these magnetic actuation mechanisms 150 may include drive mechanisms, such as, but not limited to, miniature sized brushed and brushless DC motors (not shown); 1D, 2D, and 3D motorized linear translation stages (not shown), and the like.

Further, these magnetic actuation mechanisms 150 may be configured to actuate the magnetically-responsive microposts 122 in certain beat patterns, such as synchronized beat patterns and/or metachronal beat patterns. Magnet configuration 1200 shown in FIG. 24 is an example of a magnetic actuation mechanism for generating a metachronal beat pattern.

Figure 25:
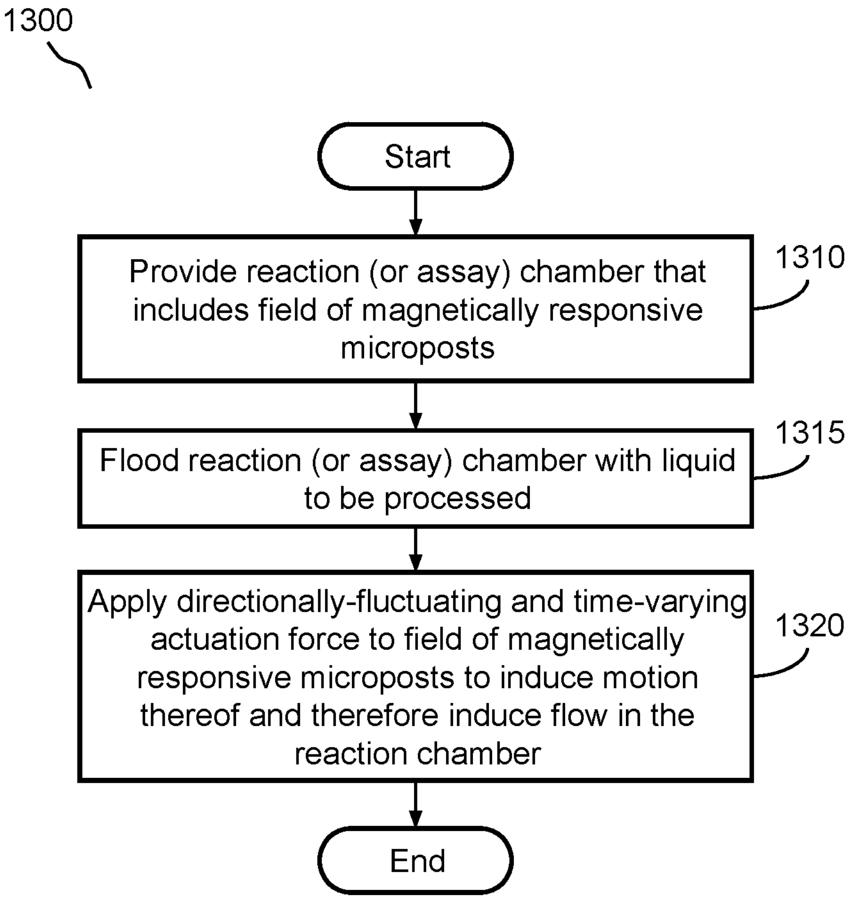
FIG. 25 illustrates a flow diagram of an example of a method of using the presently disclosed magnetic-based actuation mechanisms for actuating the magnetically-responsive microposts.

Referring now to FIG. 25 is a flow diagram of an example of a method 1300 of using the presently disclosed magnetic-based actuation mechanisms for actuating magnetically-responsive microposts within a reaction (or assay) chamber. Method 1300 may include, but is not limited to, the following steps.

At a step 1310, a reaction (or assay) chamber is provided that includes a field of magnetically-responsive microposts. For example, microfluidics device 105 shown in FIG. 1, FIG. 4, and FIG. 5 is provided that includes at least one reaction (or assay) chamber 114 in which a field of magnetically-responsive microposts 122 is installed.

At a step 1315, the reaction (or assay) chamber is flooded with liquid to be processed (e.g., mixing operations, washing operations, binding operations, and cell processing operations). For example, reaction chamber 114 of microfluidics device 105 shown in FIG. 1, FIG. 4, and FIG. 5 is flooded with liquid (e.g., sample fluid, liquid reagents, buffer solution) to be processed via, for example, mixing operations, washing operations, binding operations, and cell processing operations.

At a step 1320, a directionally-fluctuating and time-varying actuation force is applied to the field of magnetically-responsive microposts 122 to induce motion thereof and therefore induce flow in reaction chamber 114. For example, an actuation force 152 can be applied to the magnetically-responsive microposts 122 in microfluidics device 105 using any one of the presently disclosed magnetic-based actuation mechanisms described hereinabove with reference to FIG. 7 through FIG. 24, and wherein the actuation force 152 can be a directionally-fluctuating and time-varying actuation force for inducing circular (or conical) motion (see FIG. 3A) and/or tilted cone-shaped motion (or tilted conical motion) (see FIG. 3B) in magnetically-responsive microposts 122. Further, the actuation force 152 can be a directionally-fluctuating and time-varying actuation force for inducing certain beat patterns, such as synchronized beat patterns and/or metachronal beat patterns in magnetically-responsive microposts 122.

Specific examples of magnetic actuation mechanisms 150 for applying this directionally-fluctuating and time-varying actuation force include, but are not limited to, carousel-like magnetic-based actuation mechanism 300 shown in FIG. 7 through FIG. 9, carousel-like magnetic-based actuation mechanism 400 shown in FIG. 10A through FIG. 12, disc-like magnetic-based actuation mechanism 500 shown in FIG. 13 and FIG. 14, disc-like magnetic-based actuation mechanism 600 shown in FIG. 15 and FIG. 16, conveyor-like magnetic-based actuation mechanism 700 shown in FIG. 17, shaker plate-like magnetic-based actuation mechanism 800 shown in FIG. 18, electromagnet-based actuation mechanisms 900 shown in FIG. 19 and FIG. 20, linear magnetic shielding configuration 1000 shown in FIG. 21, rotating magnetic shielding configuration 1100 shown in FIG. 22 and FIG. 23, magnet configuration 1200 shown in FIG. 24 for generating a metachronal beat pattern, and the like.

Although the foregoing subject matter has been described in some detail by way of illustration and example for purposes of clarity of understanding, it will be understood by those skilled in the art that certain changes and modifications can be practiced within the scope of the appended claims.

We claim:

1. A microfluidics system comprising:

(a) a microfluidic device comprising:

i. a reaction chamber; and ii. a magnetically-responsive active surface on an inner surface of the reaction chamber, wherein the active surface comprises one or more surface-attached magnetically-responsive microposts; and (b) a magnetic-based actuation mechanism, wherein the magnetic-based actuation mechanism is configured to generate an actuation force, wherein the actuation force is sufficient to compel at least one of the one or more surface-attached magnetically-responsive microposts to exhibit motion;

wherein the magnetic-based actuation mechanism comprises a rotatable magnet mounting surface comprising at least two magnets mounted on the rotatable magnet mounting surface and arranged in a circular configuration concentric to an axis of rotation of the rotatable magnet mounting surface, and the magnetic-based actuation mechanism is positioned tangential to the microfluidic device; and wherein rotation of the rotatable magnet mounting surface causes the actuation force to be directionally-fluctuating and time-varying relative to the active surface.

2. The microfluidics system of claim 1, wherein the rotatable magnet mounting surface comprises from 2 to 20 magnets.

3. The microfluidics system of claim 1, wherein the rotatable magnet mounting surface (i) is rotatable in a plane of rotation that is substantially parallel to a plane of the active surface, or (ii) is rotatable in a plane of rotation that is substantially vertical to a plane of the active surface.

4. The microfluidics system of claim 1, wherein the magnets are:

equally spaced apart from each other in the circular configuration;

arranged in the circular configuration such that a magnetic axis of each magnet intersects the axis of rotation of the rotatable magnet mounting surface; and wherein each magnet has a north pole and a south pole that are oriented substantially in the same plane.

5. The microfluidics system of claim 1, wherein a north-south orientation of a north pole and a south pole of each adjacent magnet in the circular configuration alternates.

6. The microfluidics system of claim 1, wherein the at least two magnets mounted on the rotatable magnet mounting surface comprises one or more arc-shaped or wedge-shaped magnets arranged in a concentric configuration about the axis of rotation of the rotatable magnet mounting surface.

7. The microfluidics system of claim 6, wherein the least two magnets mounted on the rotatable magnet mounting surface comprise two or more wedge-shaped magnets arranged in the circular configuration about the axis of rotation, wherein each of the two or more wedge-shaped magnets is symmetrically bisected by a line perpendicular to the axis of rotation, and wherein each wedge of the two or more wedge-shaped magnets is oriented towards the axis of rotation or away from the axis of rotation.

8. The microfluidics system of claim 7, wherein the two or more wedge-shaped magnets comprise a first set of one or more wedge-shaped magnets oriented towards the axis of rotation and a second set of one or more wedge-shaped magnets oriented away from the axis of rotation, wherein each of the wedge-shaped magnets have an orientation opposite to an adjacent wedge-shaped magnet.

9. The microfluidics system of claim 6, wherein the least two magnets mounted on the rotatable magnet mounting surface comprise two or more arc-shaped magnets arranged in the circular configuration about the axis of rotation, wherein each of the two or more arc-shaped magnets is symmetrically bisected by a line perpendicular to the axis of rotation, and wherein each of the two or more arc-shaped magnets has an arc apex that is oriented proximal to the axis of rotation or distal to the axis of rotation.

10. The microfluidics system of claim 9, wherein each arc apex is oriented proximal to the axis of rotation or distal from the axis of rotation in a direction opposite to its adjacent neighbor arc apex.

11. The microfluidics system of claim 1, wherein the at least two magnets mounted on the rotatable magnet mounting surface comprise one or more bar-shaped magnets.

12. The microfluidics system of claim 1, wherein the rotatable magnet mounting surface has a shape selected from the group consisting of disc-shaped, polygonal, star-shaped, and hub-and-spoke shaped.

13. The microfluidics system of claim 1, wherein the motion of the magnetically-responsive microposts causes local circulation and bulk circulation of a fluid within the reaction chamber.

* * * * *